US010291766B2

(12) United States Patent
Gao et al.

(10) Patent No.: US 10,291,766 B2
(45) Date of Patent: May 14, 2019

(54) INFORMATION PROCESSING METHOD AND APPARATUS

(71) Applicant: Huawei Technologies Co., Ltd., Shenzhen (CN)

(72) Inventors: Wenmei Gao, Beijing (CN); Hao Jing, Shenzhen (CN); Yahui Wang, Beijing (CN); Xiaojuan Li, Beijing (CN); Hongrui Jiang, Shenzhen (CN); Xiyong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 15/522,939

(22) PCT Filed: Jul. 30, 2015

(86) PCT No.: PCT/CN2015/085601
§ 371 (c)(1),
(2) Date: Apr. 28, 2017

(87) PCT Pub. No.: WO2016/090928
PCT Pub. Date: Jun. 16, 2016

(65) Prior Publication Data
US 2017/0324858 A1 Nov. 9, 2017

(30) Foreign Application Priority Data
Dec. 9, 2014 (WO) ................ PCT/CN2014/093355

(51) Int. Cl.
H04M 1/00 (2006.01)
H04M 1/725 (2006.01)
(Continued)

(52) U.S. Cl.
CPC . H04M 1/72552 (2013.01); H04M 1/274516 (2013.01); H04M 19/04 (2013.01);
(Continued)

(58) Field of Classification Search
CPC ....... H04M 1/72552; H04M 1/274516; H04M 19/04; H04W 4/14; H04W 88/02; H04W 88/023; G06F 17/30; G06Q 10/10
See application file for complete search history.

(56) References Cited

U.S. PATENT DOCUMENTS 9,525,722 B2 * 12/2016 Mao .................... H04L 67/10
2013/0046830 A1 2/2013 MacDonald
(Continued)

FOREIGN PATENT DOCUMENTS

CN 101231660 A 7/2008
CN 101931701 A 12/2010
(Continued)

OTHER PUBLICATIONS

Machine Translation and Abstract of Japanese Publication No. JP2012027070, dated Feb. 9, 2012, 36 pages.
(Continued)

Primary Examiner — Khai M Nguyen
(74) Attorney, Agent, or Firm — Conley Rose, P.C.

(57) ABSTRACT

An information processing method and apparatus in the field of mobile communications technologies is provided. In the method, a first terminal obtains, during a call with a second terminal by using voice information sent by the second terminal, to-be-obtained information and object information of an object to which the to-be-obtained information belongs. The first terminal determines at least one category to which the to-be-obtained information belongs and determines a group that is in any category of the at least one category and corresponding to the object to which the to-be-obtained information belongs. The first terminal searches information in the corresponding group in any category for target information associated with the object
(Continued)

information and processes the target information with no manual searching being performed.

12 Claims, 12 Drawing Sheets

(51) Int. Cl.
*H04W 88/02* (2009.01)
*H04W 4/14* (2009.01)
*H04M 1/2745* (2006.01)
*H04M 19/04* (2006.01)
*G06F 17/30* (2006.01)
*G06Q 10/10* (2012.01)

(52) U.S. Cl.
CPC ............ *H04W 4/14* (2013.01); *H04W 88/02* (2013.01); *H04W 88/023* (2013.01); *G06F 17/30* (2013.01); *G06Q 10/10* (2013.01)

(56) References Cited

U.S. PATENT DOCUMENTS

| | | | | |
|---|---|---|---|---|
| 2013/0311511 | A1* | 11/2013 | Peng | G06F 17/3087 707/769 |
| 2014/0211669 | A1* | 7/2014 | Park | H04M 3/42 370/271 |
| 2015/0100654 | A1* | 4/2015 | Ye | H04L 51/04 709/206 |
| 2015/0163340 | A1* | 6/2015 | Kang | H04M 1/72522 455/566 |
| 2016/0364390 | A1* | 12/2016 | Zhang | G06F 17/30 |

FOREIGN PATENT DOCUMENTS

| | | | |
|---|---|---|---|
| CN | 102014161 | A | 4/2011 |
| CN | 102624637 | A | 8/2012 |
| CN | 103237136 | A | 8/2013 |
| CN | 103458126 | A | 12/2013 |
| CN | 103533143 | A | 1/2014 |
| CN | 103870547 | A | 6/2014 |
| CN | 103425656 | B * | 5/2017 |
| EP | 3113035 | A1 | 1/2017 |
| JP | 2012027070 | A | 2/2012 |
| KR | 20140097652 | A | 8/2014 |
| KR | 20140128814 | A | 11/2014 |

OTHER PUBLICATIONS

Foreign Communication From a Counterpart Application, Korean Application No. 10-2017-7011612, Korean Office Action dated Aug. 15, 2017, 8 pages.
Foreign Communication From a Counterpart Application, Korean Application No. 10-2017-7011612, English Translation of Korean Office Action dated Aug. 15, 2017, 6 pages.
Foreign Communication From a Counterpart Application, European Application No. 15866503.4, Partial Supplementary European Search Report dated Oct. 17, 2017, 13 pages.
Machine Translation and Abstract of Chinese Publication No. CN101931701, dated Dec. 29, 2010, 6 pages.
Machine Translation and Abstract of Chinese Publication No. CN103237136, dated Aug. 7, 2013, 7 pages.
Machine Translation and Abstract of Chinese Publication No. CN103458126, dated Dec. 18, 2013, 13 pages.
Machine Translation and Abstract of Chinese Publication No. CN101231660, dated Jul. 30, 2008, 8 pages.
Machine Translation and Abstract of Chinese Publication No. CN102014161, dated Apr. 13, 2011, 8 pages.
Machine Translation and Abstract of Chinese Publication No. CN103533143, dated Jan. 22, 2014, 12 pages.
Foreign Communication From a Counterpart Application, PCT Application No. PCT/CN2014/093355, International Search Report dated Aug. 21, 2015, 4 pages.
Foreign Communication From a Counterpart Application, PCT Application No. PCT/CN2015/085601, English Translation of International Search Report dated Nov. 3, 2015, 2 pages.
Foreign Communication From a Counterpart Application, PCT Application No. PCT/CN2015/085601, English Translation of Written Opinion dated Nov. 3, 2015, 7 pages.

* cited by examiner

INFORMATION PROCESSING METHOD AND APPARATUS

CROSS-REFERENCE TO RELATED APPLICATIONS

This application is a national stage application of International Patent Application No. PCT/CN2015/085601, filed on Jul. 30, 2015, which claims priority to International Application No. PCT/CN2014/093355, filed on Dec. 9, 2014. The disclosures of the aforementioned applications are hereby incorporated by reference in their entireties.

TECHNICAL FIELD

The present disclosure relates to the field of communications technologies, and in particular, to an information processing method and apparatus.

BACKGROUND

Such a scenario is often occurred during a call: terminal A and terminal B are in a calling state; a holder of the terminal A wants information that is stored in terminal B to be sent to terminal A such as, for example, contact information of contact A that is stored in terminal B sent to terminal A. Generally, terminal B needs to first return to a home screen, and then enter a contacts screen, and send the found contact information of contact A to terminal A in a short message service (SMS) message manner. Alternatively, terminal B sends the found contact information of contact A to terminal A in a voice manner. Alternatively, the opposite party is informed of the found contact information of contact A in a voice manner during a current call. However, this manner requires manual searching, and steps are complex. Therefore, the foregoing prompt manner for prompting contact information has disadvantages of relatively long duration and relatively low efficiency.

SUMMARY

Embodiments of the present disclosure provide an information processing method and apparatus, so as to fix disadvantages of relatively long duration and relatively low efficiency in a current information processing process.

According to a first aspect, an information processing method is provided, including obtaining, by a first terminal during a call with a second terminal by using voice information sent by the second terminal, to-be-obtained information and object information of an object to which the to-be-obtained information belongs; determining, by the first terminal, at least one category to which the to-be-obtained information belongs; determining, by the first terminal, a group that is in any category of at least one category and corresponding to the object to which the to-be-obtained information belongs; searching, by the first terminal, information in the corresponding group in any category for target information associated with the object information; and processing, by the first terminal, the target information.

With reference to the first aspect, in a first possible implementation manner, before the obtaining, by a first terminal, to-be-obtained information and object information of an object to which the to-be-obtained information belongs, the method further includes detecting, by the first terminal, that the voice information sent by the second terminal includes at least one keyword in a preset keyword library.

With reference to the first aspect, or the first possible implementation manner of the first aspect, in a second possible implementation manner, determining, by the first terminal, a group that is in any category of at least one category and corresponding to the object to which the to-be-obtained information belongs includes using, by the first terminal, a group that is in any category and corresponding to a contact corresponding to the second terminal as the group that is in any category and corresponding to the object to which the to-be-obtained information belongs.

With reference to any one of the first aspect, or the first to the second possible implementation manners of the first aspect, in a third possible implementation manner, after obtaining, by a first terminal, to-be-obtained information and object information, and before determining a group that is in any category and corresponding to the object to which the to-be-obtained information belongs, the method further includes extracting, by the first terminal, valid information from object information; and searching, by the first terminal, information in the corresponding group in any category for target information associated with the object information includes searching, by the first terminal, information in the corresponding group in any category for target information associated with the valid information.

With reference to the third possible implementation manner of the first aspect, in a fourth possible implementation manner, extracting, by the first terminal, valid information from object information includes using, by the first terminal, other information, except a qualifier, in the object information as the valid information.

With reference to any one of the first aspect, or the first to the fourth possible implementation manners of the first aspect, in a fifth possible implementation manner, processing, by the first terminal, target information includes prompting, by the first terminal, the target information and sending the target information; or determining, by the first terminal, an application corresponding to the target information and operating, according to the target information, the determined application corresponding to the target information.

With reference to the fifth possible implementation manner of the first aspect, in a sixth possible implementation manner, prompting, by the first terminal, the target information includes determining, by the first terminal, an auxiliary device connected to the first terminal; and prompting, by the first terminal, the target information on the auxiliary device.

With reference to the sixth possible implementation manner of the first aspect, in a seventh possible implementation manner, if the auxiliary device is an in-vehicle terminal, before prompting by the first terminal the target information on the auxiliary device, the method further includes, after determining that the call with the second terminal is ended, prompting, by the first terminal, the target information on the auxiliary device by using voice information.

With reference to any one of the fifth to the seventh possible implementation manners of the first aspect, in an eighth possible implementation manner, sending, by the first terminal, target information includes sending, by the first terminal, target information in a preset sending manner.

With reference to the eighth possible implementation manner of the first aspect, in a ninth possible implementation manner, the preset sending manner is one or any of the following manners: an SMS manner, a mail manner, and an instant message manner.

With reference to any one of the first aspect, or the first to the ninth possible implementation manners of the first aspect, in a tenth possible implementation manner, searching, by the first terminal, information in the corresponding group in any category for target information associated with the object information includes, if any category is a picture category, searching by the first terminal by using a facial recognition technology, information in the corresponding group in any category for target information associated with the object information.

With reference to the tenth possible implementation manner of the first aspect, in an eleventh possible implementation manner, searching, by the first terminal by using a facial recognition technology, information in the corresponding group in any category for the target information associated with the object information includes searching, by the first terminal according to a time condition and/or a location condition by using the facial recognition technology, information in the corresponding group in any category for target information associated with object information.

With reference to the tenth or the eleventh possible implementation manner of the first aspect, in a twelfth possible implementation manner, object information is information about the contact corresponding to the second terminal and/or information about a contact corresponding to a third terminal.

According to a second aspect, an application presentation method is provided, including obtaining, by a first terminal, target application information during a call with a second terminal by using voice information sent by the second terminal; determining, by the first terminal, a client used when an application corresponding to the target application information is operated; determining, by the first terminal, a category to which the application corresponding to the target application information belongs and searching for, in the category to which the application belongs in the client, the application corresponding to the target application information; and presenting, by the first terminal, the found application corresponding to the target application information.

With reference to the second aspect, in a first possible implementation manner, before the obtaining, by a first terminal, target application information by using voice information sent by the second terminal, the method further includes detecting, by the first terminal, that the voice information sent by the second terminal includes at least one keyword in a preset keyword library.

According to a third aspect, an information processing apparatus is provided, including an obtaining unit configured to obtain, during a call with a second terminal by using voice information sent by the second terminal, to-be-obtained information and object information of an object to which the to-be-obtained information belongs; a determining unit configured to determine at least one category to which the to-be-obtained information belongs, and a group that is in any category of at least one category and corresponding to the object to which the to-be-obtained information belongs; a search unit configured to search information in the corresponding group in any category for target information associated with the object information; and a processing unit configured to process the target information.

With reference to the third aspect, in a first possible implementation manner, the apparatus further includes a detection unit, where the detection unit is configured to detect that the voice information sent by the second terminal includes at least one keyword in a preset keyword library.

With reference to the third aspect, or the first possible implementation manner of the third aspect, in a second possible implementation manner, that the determining unit determines the group that is in any category of the at least one category and corresponds to the object to which the to-be-obtained information belongs includes using a group that is in any category and corresponds to a contact corresponding to the second terminal as the group that is in any category and corresponds to the object to which the to-be-obtained information belongs.

With reference to any one of the third aspect, or the first to the second possible implementation manners of the third aspect, in a third possible implementation manner, the apparatus further includes an extraction unit, where the extraction unit is configured to extract valid information from the object information; and that the search unit searches the information in the corresponding group in any category for the target information associated with the object information includes searching the information in the corresponding group in any category for target information associated with the valid information.

With reference to the third possible implementation manner of the third aspect, in a fourth possible implementation manner, the extraction unit is configured to use other information, except a qualifier, in the object information as the valid information.

With reference to any one of the third aspect, or the first to the fourth possible implementation manners of the third aspect, in a fifth possible implementation manner, the processing unit is configured to prompt the target information, and send the target information; or determine an application corresponding to the target information, and operate, according to the target information, the determined application corresponding to the target information.

With reference to the fifth possible implementation manner of the third aspect, in a sixth possible implementation manner, that the processing unit prompts the target information includes determining an auxiliary device that is connected to the first terminal; and prompting the target information on the auxiliary device.

With reference to the sixth possible implementation manner of the third aspect, in a seventh possible implementation manner, if the auxiliary device is an in-vehicle terminal, the processing unit is further configured to, after determining that the call with the second terminal is ended, prompt the target information on the auxiliary device by using voice information.

With reference to any one of the fifth to the seventh possible implementation manners of the third aspect, in an eighth possible implementation manner, that the processing unit sends the target information includes sending the target information in a preset sending manner.

With reference to the eighth possible implementation manner of the third aspect, in a ninth possible implementation manner, the preset sending manner is one or any combination of the following manners: an SMS manner, a mail manner, and an instant message manner.

With reference to any one of the third aspect, or the first to the ninth possible implementation manners of the third aspect, in a tenth possible implementation manner, the search unit is configured to, if any category is a picture category, search by using a facial recognition technology, the information in the corresponding group in any category for the target information associated with the object information.

With reference to the tenth possible implementation manner of the third aspect, in an eleventh possible implementation manner, that the search unit searches, by using the facial recognition technology, the information in the corresponding group in any category for the target information associated with the object information includes searching, according to a time condition and/or a location condition by using the facial recognition technology, the information in the corresponding group in any category for target information associated with the object information.

With reference to the tenth or the eleventh possible implementation manner of the third aspect, in a twelfth possible implementation manner, the object information is information about the contact corresponding to the second terminal and/or information about a contact corresponding to a third terminal.

According to a fourth aspect, an application presentation apparatus is provided, including an obtaining unit configured to obtain target application information during a call with a second terminal by using voice information sent by the second terminal; a determining unit configured to determine a client used when an application corresponding to the target application information is operated; a search unit configured to determine a category to which the application corresponding to the target application information belongs, and search for, in the category to which the application belongs in the client, the application corresponding to the target application information; and a presentation unit configured to present the found application corresponding to the target application information.

With reference to the fourth aspect, in a first possible implementation manner, the apparatus further includes a detection unit, where the detection unit is configured to detect that the voice information sent by the second terminal includes at least one keyword in a preset keyword library.

According to a fifth aspect, a terminal is provided, including a communications bus, at least one communications interface, a memory, and a processor, where the communications bus is configured to implement connection and communication between the foregoing components; any communications interface in at least one communications interface is configured to connect and communicate with a peripheral device; the memory is configured to store executable program code; and by executing the program code stored in the memory, the processor is configured to obtain, during a call with a second terminal by using voice information sent by the second terminal, to-be-obtained information and object information of an object to which the to-be-obtained information belongs; determine at least one category to which the to-be-obtained information belongs; determine a group that is in any category of at least one category and corresponding to the object to which the to-be-obtained information belongs; search information in the corresponding group in any category for target information associated with the object information; and process the target information.

With reference to the fifth aspect, in a first possible implementation manner, the processor is further configured to detect that the voice information sent by the second terminal includes at least one keyword in a preset keyword library.

With reference to the fifth aspect, or the first possible implementation manner of the fifth aspect, in a second possible implementation manner, the processor is configured to use a group that is in any category and corresponding to a contact corresponding to the second terminal as the group that is in any category and corresponding to the object to which the to-be-obtained information belongs.

With reference to any one of the fifth aspect, or the first to the second possible implementation manners of the fifth aspect, in a third possible implementation manner, the processor is further configured to extract valid information from the object information; and that the processor searches the information in the corresponding group in any category for the target information associated with the object information includes searching the information in the corresponding group in any category for target information associated with the valid information.

With reference to the third possible implementation manner of the fifth aspect, in a fourth possible implementation manner, the processor is configured to use other information, except a qualifier, in the object information as the valid information.

With reference to any one of the fifth aspect, or the first to the fourth possible implementation manners of the fifth aspect, in a fifth possible implementation manner, the processor is configured to prompt the target information, and send the target information; or determine an application corresponding to the target information, and operate, according to the target information, the determined application corresponding to the target information.

With reference to the fifth possible implementation manner of the fifth aspect, in a sixth possible implementation manner, the processor is configured to determine an auxiliary device connected to the first terminal; and prompt the target information on the auxiliary device.

With reference to the sixth possible implementation manner of the fifth aspect, in a seventh possible implementation manner, if the auxiliary device is an in-vehicle terminal, the processor is further configured to, after determining that the call with the second terminal is ended, prompt the target information on the auxiliary device by using voice information.

With reference to any one of the fifth to the seventh possible implementation manners of the fifth aspect, in an eighth possible implementation manner, the processor is configured to send the target information in a preset sending manner.

With reference to the eighth possible implementation manner of the fifth aspect, in a ninth possible implementation manner, the preset sending manner is one or any combination of the following manners: an SMS manner, a mail manner, and an instant message manner.

With reference to any one of the fifth aspect, or the first to the ninth possible implementation manners of the fifth aspect, in a tenth possible implementation manner, the processor is configured to, if any category is a picture category, search by using a facial recognition technology the information in the corresponding group in any category for the target information associated with the object information.

With reference to the tenth possible implementation manner of the fifth aspect, in an eleventh possible implementation manner, the processor is configured to search, according to a time condition and/or a location condition by using the facial recognition technology, the information in the corresponding group in any category for the target information associated with the object information.

With reference to the tenth or the eleventh possible implementation manner of the fifth aspect, in a twelfth possible implementation manner, the object information is information about the contact corresponding to the second terminal and/or information about a contact corresponding to a third terminal.

According to a sixth aspect, a computer program product is provided, where the computer program product includes a readable storage medium configured to store computer program code, the computer degree code runs on a processor, and the computer program code is used to obtain, during a call with a second terminal by using voice information sent by the second terminal, to-be-obtained information and object information of an object to which the to-be-obtained information belongs; determine at least one category to which the to-be-obtained information belongs; determine a group that is in any category of the at least one category and corresponding to the object to which the to-be-obtained information belongs; search information in the corresponding group in any category for target information associated with the object information; and process the target information.

According to a seventh aspect, a terminal is provided, including a communications bus, at least one communications interface, a memory, and a processor, where the communications bus is configured to implement connection and communication between the foregoing components; any communications interface in the at least one communications interface is configured to connect and communicate with a peripheral device; the memory is configured to store executable program code; and by executing the program code stored in the memory, the processor is configured to obtain target application information during a call with a second terminal by using voice information sent by the second terminal; determine a client used when an application corresponding to the target application information is operated; determine a category to which the application corresponding to the target application information belongs, and search for, in the category to which the application belongs in the client, the application corresponding to the target application information; and present the found application corresponding to the target application information.

With reference to the seventh aspect, in a first possible implementation manner, the processor is further configured to detect that the voice information sent by the second terminal includes at least one keyword in a preset keyword library.

According to an eighth aspect, a computer program product is provided, where the computer program product includes a readable storage medium configured to store computer program code, the computer degree code runs on a processor, and the computer program code is used to obtain target application information during a call with a second terminal by using voice information sent by the second terminal; determine a client used when an application corresponding to the target application information is operated; determine a category to which the application corresponding to the target application information belongs, and search for, in the category to which the application belongs in the client, the application corresponding to the target application information; and present the found application corresponding to the target application information.

According to a ninth aspect, an information sending method is provided, including receiving, by a first terminal, a message sent by a second terminal; determining, by the first terminal, a contact and a target receiver from the message; and obtaining, by the first terminal, contact information of the contact from an address book of the first terminal, and sending the contact information to the target receiver.

With reference to the ninth aspect, in a first possible implementation manner, the contact information includes at least one of a telephone number, a social network account, or a contact address.

With reference to the ninth aspect, or the first possible implementation manner of the ninth aspect, in a second possible implementation manner, determining, by the first terminal, the target receiver from the message includes, if a keyword included in the message has a corresponding object, determining, by the first terminal, the target receiver according to the object corresponding to the keyword; or if a keyword included in the message does not have a corresponding object, using, by the first terminal, the second terminal as the target receiver; where the keyword is a keyword used to represent a sending operation.

With reference to the second possible implementation manner of the ninth aspect, in a third possible implementation manner, determining, by the first terminal, the target receiver according to the object corresponding to the keyword includes, if a target contact including valid information of the object is in contacts stored in the first terminal, directly using the target contact as the target receiver; or if the object is "me", using, by the first terminal, the second terminal as the target receiver; or if the object is "him" or "her", performing, by the first terminal, semantic analysis on a context message of the message, and determining the target receiver from the context message.

With reference to any one of the ninth aspect, or the first to the third possible implementation manners of the ninth aspect, in a fourth possible implementation manner, after the first terminal determines the contact information, and before sending the contact information to the target receiver, the method further includes presenting, by the first terminal, the contact information.

With reference to the fourth possible implementation manner of the ninth aspect, in a fifth possible implementation manner, presenting, by the first terminal, the contact information includes presenting, by the first terminal, the contact information in a suspend box, where the suspend box is suspended above an interface that presents the message; or presenting, by the first terminal, the contact information in a content editing box of an interface that presents the message.

With reference to the fifth possible implementation manner of the ninth aspect, in a sixth possible implementation manner, before sending, by the first terminal, the contact information to the target receiver, the method further includes suspending, by the first terminal, a sending shortcut button above the interface that presents the message; and sending, by the first terminal, the contact information to the target receiver includes, when receiving an instruction to trigger the sending shortcut button, sending, by the first terminal, the contact information in the suspend box to the target receiver.

With reference to the third possible implementation manner of the ninth aspect, in a seventh possible implementation manner, after the first terminal determines the contact information, and before the presenting the contact information, the method further includes jumping, by the first terminal, to an interaction interface between the first terminal and the target receiver from an interface that presents the message; and presenting, by the first terminal, the contact information includes presenting, by the first terminal, the contact information in a suspend box, where the suspend box is suspended above the interaction interface between the first terminal and the target receiver; or presenting, by the first terminal, the contact information in a content editing box of the interaction interface between the first terminal and the target receiver.

With reference to the seventh possible implementation manner of the ninth aspect, in an eighth possible implementation manner, before sending, by the first terminal, the contact information to the target receiver, the method further includes suspending, by the first terminal, a sending shortcut button above the interaction interface between the first terminal and the target receiver; and sending, by the first terminal, the contact information to the target receiver includes, when receiving an instruction to trigger the sending shortcut button, sending, by the first terminal, the contact information in the suspend box to the target receiver.

According to a tenth aspect, an information sending method is provided, including receiving, by a first terminal, a message sent by a second terminal; obtaining, by the first terminal from the message, a type to which target information belongs, object information associated with the target information, and a target receiver; obtaining, by the first terminal from a data source corresponding to the type to which the target information belongs, a data item matching the object information, where the target information includes the data item; and sending, by the first terminal, the target information to the target receiver.

With reference to the tenth aspect, in a first possible implementation manner, obtaining, by the first terminal from the message, a type to which target information belongs, object information associated with the target information, and a target receiver includes performing, by the first terminal, semantic analysis on the message, and obtaining the type to which the target information belongs, the object information, and the target receiver.

With reference to the tenth aspect, or the first possible implementation manner of the tenth aspect, in a second possible implementation manner, obtaining, by the first terminal, the target receiver from the message includes, if a first-type keyword included in the message has a corresponding object, determining, by the first terminal, the target receiver according to the object corresponding to the first-type keyword; or if a first-type keyword included in the message does not have a corresponding object, using, by the first terminal, the second terminal as the target receiver; where the first-type keyword is a keyword used to represent a sending operation.

With reference to the second possible implementation manner of the tenth aspect, in a third possible implementation manner, determining, by the first terminal, the target receiver according to the object corresponding to the first-type keyword includes, if a target object including valid information of the object corresponding to the first-type keyword is in objects stored in the first terminal, directly using the target object as the target receiver; or if the object is "me", using, by the first terminal, the second terminal as the target receiver; or if the object is "him" or "her", performing, by the first terminal, semantic analysis on a context message of the message, and determining the target receiver from the context message.

With reference to any one of the tenth aspect, or the first to the third possible implementation manners of the tenth aspect, in a fourth possible implementation manner, after receiving, by a first terminal, a message sent by the second terminal, and before obtaining the type to which the target information belongs, the object information, and the target receiver, the method further includes determining, by the first terminal, that the message includes at least one second-type keyword, where the second-type keyword is associated with at least one of a telephone number, a social network account, a bank account, a contact address, user information, a schedule, or multimedia content.

With reference to the fourth possible implementation manner of the tenth aspect, in a fifth possible implementation manner, after the first terminal determines at least one second-type keyword, and before obtaining the type to which the target information belongs, the object information, and the target receiver, the method further includes determining, by the first terminal, that the message includes at least one third-type keyword, where the third-type keyword is a keyword used to represent that the message has a request intention.

With reference to any one of the tenth aspect, or the first to the fifth possible implementation manners of the tenth aspect, in a sixth possible implementation manner, after the first terminal determines the target information, and before sending the target information to the target receiver, the method further includes presenting, by the first terminal, target information.

With reference to the sixth possible implementation manner of the tenth aspect, in a seventh possible implementation manner, presenting, by the first terminal, the target information includes presenting, by the first terminal, target information in a suspend box, where the suspend box is suspended above an interface that presents the message; or presenting, by the first terminal, target information in a content editing box of an interface that presents the message.

With reference to the seventh possible implementation manner of the tenth aspect, in an eighth possible implementation manner, before sending, by the first terminal, target information to the target receiver, the method further includes suspending, by the first terminal, a sending shortcut button above the interface that presents the message; and sending, by the first terminal, target information to the target receiver includes, when receiving an instruction to trigger the sending shortcut button, sending, by the first terminal, target information in the suspend box to the target receiver.

With reference to the sixth possible implementation manner of the tenth aspect, in a ninth possible implementation manner, after determining, by the first terminal, the target receiver of the target information, and before presenting the target information, the method further includes jumping to an interaction interface between the first terminal and the target receiver from an interface that presents the message; and presenting, by the first terminal, the target information includes presenting, by the first terminal, the target information in a suspend box, where the suspend box is suspended above the interaction interface between the first terminal and the target receiver; or presenting, by the first terminal, the target information in a content editing box of the interaction interface between the first terminal and the target receiver.

With reference to the ninth possible implementation manner of the tenth aspect, in a tenth possible implementation manner, before sending, by the first terminal, the target information to the target receiver, the method further includes suspending, by the first terminal, a sending shortcut button above the interaction interface between the first terminal and the target receiver; and sending, by the first terminal, the target information to the target receiver includes when receiving an instruction to trigger the sending shortcut button, sending, by the first terminal, the target information in the suspend box to the target receiver.

With reference to the sixth possible implementation manner of the tenth aspect, in an eleventh possible implementation manner, sending, by the first terminal, the target information to the target receiver includes, if the message is an SMS message, and a media type of the target information is text, sending, by the first terminal, the target information to the target receiver in an SMS message manner; if the message is an SMS message, and a media type of the target information is a multimedia format, sending, by the first terminal, the target information to the target receiver in an instant message manner or in a Multimedia Messaging Service (MMS) message manner; if the message is an instant message, sending, by the first terminal, the target information to the target receiver in an instant message manner; or if the message is received in a mail manner, sending, by the first terminal, the target information to the target receiver in a mail manner.

With reference to any one of the tenth aspect, or the first to the eleventh possible implementation manners of the tenth aspect, in a twelfth possible implementation manner, obtaining, by the first terminal from a data source corresponding to the type to which the target information belongs, a data item matching the object information includes, if the type to which the target information belongs is a picture, searching, by the first terminal, the photo album for the target information by using a facial recognition technology.

With reference to any one of the tenth aspect, or the first to the twelfth possible implementation manners of the tenth aspect, in a thirteenth possible implementation manner, the message is at least one of an SMS message, an instant message, or a mail.

According to an eleventh aspect, a first terminal is provided, including a receiving unit configured to receive a message sent by a second terminal; a determining unit configured to determine a contact and a target receiver from the message; where the receiving unit is further configured to obtain contact information of the contact from an address book of the first terminal; and a sending unit configured to send the contact information to the target receiver.

With reference to the eleventh aspect, in a first possible implementation manner, contact information includes at least one of a telephone number, a social network account, or a contact address.

With reference to the eleventh aspect, or the first possible implementation manner of the eleventh aspect, in a second possible implementation manner, the determining unit determines the target receiver from the message, if a keyword included in the message has a corresponding object, by determining the target receiver according to the object corresponding to the keyword; or if a keyword included in the message does not have a corresponding object, the determining unit uses the second terminal as the target receiver; where the keyword is a keyword used to represent a sending operation.

With reference to the second possible implementation manner of the eleventh aspect, in a third possible implementation manner, the determining unit determines the target receiver according to the object corresponding to the keyword, if a target contact including valid information of the object is in contacts stored in the first terminal, by directly using the target contact as the target receiver; or if the object is "me", the determining unit uses the second terminal as the target receiver; or if the object is "him" or "her", the determining unit performs semantic analysis on a context message of the message, and determines the target receiver from the context message.

With reference to any one of the eleventh aspect, or the first to the third possible implementation manners of the eleventh aspect, in a fourth possible implementation manner, the first terminal further includes a presentation unit configured to present the contact information.

With reference to the fourth possible implementation manner of the eleventh aspect, in a fifth possible implementation manner, the presentation unit presents the contact information includes a presentation unit that presents the contact information in a suspend box, where the suspend box is suspended above an interface that presents the message; or the presentation unit presents the contact information in a content editing box of an interface that presents the message.

With reference to the fifth possible implementation manner of the eleventh aspect, in a sixth possible implementation manner, the presentation unit is further configured to suspend a sending shortcut button above the interface that presents the message; the receiving unit is further configured to receive an instruction to trigger the sending shortcut button; and the sending unit sends the contact information to the target receiver, when the receiving unit receives the instruction to trigger the sending shortcut button, by sending the contact information in the suspend box to the target receiver.

With reference to the third possible implementation manner of the eleventh aspect, in a seventh possible implementation manner, the first terminal further includes a jumping unit configured to jump to an interaction interface between the first terminal and the target receiver from an interface that presents the message; where the presentation unit presents the contact information by presenting the contact information in a suspend box, where the suspend box is suspended above the interaction interface between the first terminal and the target receiver; or the presentation unit presents the contact information in a content editing box of the interaction interface between the first terminal and the target receiver.

With reference to the seventh possible implementation manner of the eleventh aspect, in an eighth possible implementation manner, the presentation unit is further configured to suspend a sending shortcut button above the interaction interface between the first terminal and the target receiver; the receiving unit is further configured to receive an instruction to trigger the sending shortcut button; and the sending unit sends the contact information to the target receiver, when the receiving unit receives the instruction to trigger the sending shortcut button, by sending the contact information in the suspend box to the target receiver.

According to a twelfth aspect, a first terminal is provided, including a receiving unit configured to receive a message sent by a second terminal; an obtaining unit configured to obtain, from the message, a type to which target information belongs, object information associated with the target information, and a target receiver; where the obtaining unit is further configured to obtain, from a data source corresponding to the type to which the target information belongs, a data item matching the object information, where the target information includes the data item; and a sending unit configured to send the target information to the target receiver.

With reference to the twelfth aspect, in a first possible implementation manner, the obtaining unit obtains, from the message, the type to which the target information belongs, the object information associated with the target information, and the target receiver includes the obtaining unit that performs semantic analysis on the message, and obtains the type to which the target information belongs, the object information, and the target receiver.

With reference to the twelfth aspect, or the first possible implementation manner of the twelfth aspect, in a second possible implementation manner, the obtaining unit obtains the target receiver from the message, if a first-type keyword included in the message has a corresponding object, by determining the target receiver according to the object corresponding to the first-type keyword; or if a first-type keyword included in the message does not have a corresponding object, the obtaining unit uses the second terminal as the target receiver; where the first-type keyword is a keyword used to represent a sending operation.

With reference to the second possible implementation manner of the twelfth aspect, in a third possible implementation manner, the obtaining unit determines the target receiver according to the object corresponding to the first-type keyword, if a target object including valid information of the object corresponding to the first-type keyword is in objects stored in the first terminal, by directly using the target object as the target receiver; or if the object is "me", the obtaining unit uses the second terminal as the target receiver; or if the object is "him" or "her", the obtaining unit performs semantic analysis on a context message of the message, and determines the target receiver from the context message.

With reference to any one of the twelfth aspect, or the first to the third possible implementation manners of the twelfth aspect, in a fourth possible implementation manner, the first terminal further includes a determining unit configured to determine that the message includes at least one second-type keyword, where the second-type keyword is associated with at least one of a telephone number, a social network account, a bank account, a contact address, user information, a schedule, or multimedia content.

With reference to the fourth possible implementation manner of the twelfth aspect, in a fifth possible implementation manner, the determining unit is further configured to determine that the message includes at least one third-type keyword, where the third-type keyword is a keyword used to represent that the message has a request intention.

With reference to any one of the twelfth aspect, or the first to the fifth possible implementation manners of the twelfth aspect, in a sixth possible implementation manner, the first terminal further includes a presentation unit configured to present the target information.

With reference to the sixth possible implementation manner of the twelfth aspect, in a seventh possible implementation manner, the presentation unit presents the target information by presenting the target information in a suspend box, where the suspend box is suspended above an interface that presents the message; or presenting the target information in a content editing box of an interface that presents the message.

With reference to the seventh possible implementation manner of the twelfth aspect, in an eighth possible implementation manner, the presentation unit is further configured to suspend a sending shortcut button above the interface that presents the message; the receiving unit is further configured to receive an instruction to trigger the sending shortcut button; and that the sending unit sends the target information to the target receiver, when the receiving unit receives the instruction to trigger the sending shortcut button, by sending the target information in the suspend box to the target receiver.

With reference to the sixth possible implementation manner of the twelfth aspect, in a ninth possible implementation manner, the first terminal further includes a jumping unit configured to jump to an interaction interface between the first terminal and the target receiver from an interface that presents the message; where the presentation unit presents the target information by presenting the target information in a suspend box, where the suspend box is suspended above the interaction interface between the first terminal and the target receiver; or the presentation unit presents the target information in a content editing box of the interaction interface between the first terminal and the target receiver.

With reference to the ninth possible implementation manner of the twelfth aspect, in a tenth possible implementation manner, the presentation unit is further configured to suspend a sending shortcut button above the interaction interface between the first terminal and the target receiver; the receiving unit is further configured to receive an instruction to trigger the sending shortcut button; and the sending unit sends the target information to the target receiver, when the instruction to trigger the sending shortcut button is received, by sending the target information in the suspend box to the target receiver.

With reference to the sixth possible implementation manner of the twelfth aspect, in an eleventh possible implementation manner, the sending unit sends the target information to the target receiver, if the message is an SMS message and a media type of the target information is text, by sending the target information to the target receiver in an SMS message manner; if the message is an SMS message, and a media type of the target information is a multimedia format, the sending unit sends the target information to the target receiver in an instant message manner or in an MMS message manner; if the message is an instant message, the sending unit sends the target information to the target receiver in an instant message manner; or if the message is received in a mail manner, the sending unit sends the target information to the target receiver in a mail manner.

With reference to any one of the twelfth aspect, or the first to the eleventh possible implementation manners of the twelfth aspect, in a twelfth possible implementation manner, the obtaining unit obtains, from the data source corresponding to the type to which the target information belongs, the data item matching the object information, if the type to which the target information belongs is a picture, by searching the photo album for the target information by using a facial recognition technology.

With reference to any one of the twelfth aspect, or the first to the twelfth possible implementation manners of the twelfth aspect, in a thirteenth possible implementation manner, the message is at least one of an SMS message, an instant message, or a mail.

According to a thirteenth aspect, a portable electronic device is provided, including a display, where the display includes a touch-sensitive surface and a display screen; one or more processors; a memory; and one or more programs, where the one or more programs are stored in the memory and are configured to be executed by the one or more processors, and the one or more programs include an instruction used to execute the method according to any one of the ninth aspect, or the first to the eighth possible implementation manners of the ninth aspect.

According to a fourteenth aspect, a portable electronic device is provided, including a computer readable storage medium storing one or more programs, where the one or more programs include an instruction, when being executed by the portable electronic device including a display and multiple application programs, the instruction makes the portable electronic device execute the method according to any one of the ninth aspect, or the first to the eighth possible implementation manners of the ninth aspect, and the display includes a touch-sensitive surface and a display screen.

According to a fifteenth aspect, a portable electronic device is provided, including a display, where the display includes a touch-sensitive surface and a display screen; one or more processors; a memory; and one or more programs, where the one or more programs are stored in the memory and are configured to be executed by the one or more processors, and the one or more programs include an instruction used to execute the method according to any one of the tenth aspect, or the first to the thirteenth possible implementation manners of the tenth aspect.

According to a sixteenth aspect, a portable electronic device is provided, including a computer readable storage medium storing one or more programs, where the one or more programs include an instruction, when being executed by the portable electronic device including a display and multiple application programs, the instruction makes the portable electronic device execute the method according to any one of the tenth aspect, or the first to the thirteenth possible implementation manners of the tenth aspect, and the display includes a touch-sensitive surface and a display screen.

In the embodiments of the present disclosure, a first terminal obtains, during a call with a second terminal by using voice information sent by the second terminal, to-be-obtained information and object information of an object to which the to-be-obtained information belongs; the first terminal determines at least one category to which the to-be-obtained information belongs; the first terminal determines a group that is in any category of at least one category and corresponding to the object to which the to-be-obtained information belongs; the first terminal searches information in the corresponding group in any category for target information associated with the object information; and the first terminal processes the target information, and no manual searching is performed. Therefore, disadvantages of relatively long duration and relatively low efficiency in a current information processing process are fixed.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, preferred implementation manners of the present disclosure are described in detail with reference to the accompanying drawings. It should be understood that the preferred embodiments described herein are merely used to illustrate and explain the present disclosure, but are not intended to limit the present disclosure. In addition, the embodiments of the present application and features in the embodiments may be mutually combined in a case in which they do not conflict with each other.

In the following, the preferred implementation manners of the present disclosure are described in detail with reference to the accompanying drawings.

Figure 1:
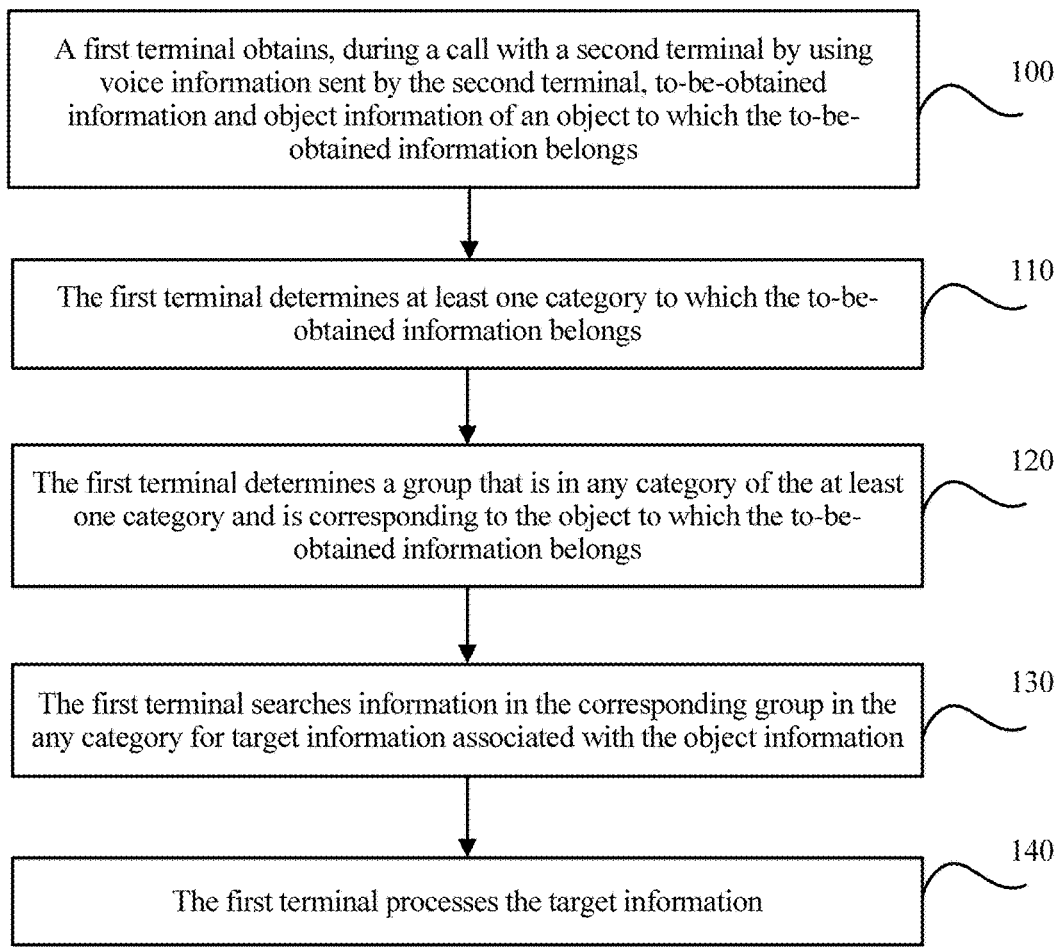
FIG. 1 is a flowchart of information processing according to an embodiment of the present disclosure.

Referring to FIG. 1, an information processing procedure in an embodiment of the present disclosure is as follows:

Step 100: A first terminal obtains, during a call with a second terminal by using voice information sent by the second terminal, to-be-obtained information and object information of an object to which the to-be-obtained information belongs.

Step 110: The first terminal determines at least one category to which the to-be-obtained information belongs.

Step 120: The first terminal determines a group that is in any category of the at least one category and corresponding to the object to which the to-be-obtained information belongs.

Step 130: The first terminal searches information in the corresponding group in any category for target information associated with the object information.

Step 140: The first terminal processes the target information.

In this embodiment of the present disclosure, the to-be-obtained information may be a telephone number, a mail address, a QQ® number (that is, an instant messaging number provided through the QQ instant messaging software available from TENCENT), or the like, and the object to which the to-be-obtained information belongs refers to an object corresponding to the foregoing information. For example, for "the telephone number of Xiaoli", "the telephone number" is the to-be-obtained information, and "Xiaoli" is an object to which "the telephone number" belongs.

Optionally, in this embodiment of the present disclosure, a procedure of step 100 to step 140 is not performed when the first terminal is in a call with the second terminal. In this way, the first terminal has a disadvantage of relatively large power consumption. Therefore, to reduce power consumption of the first terminal, in this embodiment of the present disclosure, the procedure of step 100 to step 140 is performed under triggering of a trigger condition.

Optionally, in this embodiment of the present disclosure, the first terminal is triggered, in multiple manners, to obtain the to-be-obtained information and the object information of the object to which the to-be-obtained information belongs. For example, before the first terminal obtains the to-be-obtained information and the object information of the object to which the to-be-obtained information belongs, the following operation is further included:

The first terminal detects that the voice information sent by the second terminal includes at least one keyword in a preset keyword library.

In this way, that the first terminal detects that the voice information sent by the second terminal includes the at least one keyword in the preset keyword library is used as a trigger condition that the first terminal performs an operation of obtaining the to-be-obtained information and the object information of the object to which the to-be-obtained information belongs.

Optionally, in this embodiment of the present disclosure, the keyword in the preset keyword library may be textual or numeric information associated with one or any combination of several of the following words, applications or devices: mobile phone, telephone number, telephone, number, fixed-lined phone, WeChat® (that is, a social media number associated with the WeChat social media application available from TENCENT), QQ, microblog account, mailbox address, mail, contact information, home address, company address, address, photo, application (APP), news, song, movie, and the like.

It should be noted that the keyword in the keyword library may be stored in a form of one or any combination of a Chinese character form, a Pinyin form, or an English form.

Optionally, in this embodiment of the present disclosure, the first terminal determines, in multiple manners, the group that is in any category of the at least one category and corresponding to the object to which the to-be-obtained information belongs, and the following manner may be used:

The first terminal uses a group that is in any category and corresponding to a contact corresponding to the second terminal as the group that is in any category and corresponding to the object to which the to-be-obtained information belongs.

For example, if the contact corresponding to the second terminal belongs to a group "family" in an address book, the group corresponding to the object to which the to-be-obtained information belongs is "family" in the address book. If the contact corresponding to the second terminal belongs to a group "colleague" in an address book, the group corresponding to the object to which the to-be-obtained information belongs is "colleague" in the address book.

For another example, when the to-be-obtained information is a QQ number, if an address book stores QQ numbers, and the contact corresponding to the second terminal belongs to a group "family" in the address book, the first terminal searches for, in the group "family" in the address book, a QQ number of the object to which the to-be-obtained information belongs. If an address book does not store QQ numbers, and the contact corresponding to the second terminal belongs to a group "colleague" in QQ software, the first terminal searches for, in the group "colleague" in a component corresponding to the QQ software, a QQ number of the object to which the to-be-obtained information belongs.

Further, in this embodiment of the present disclosure, when being to detect a keyword, the first terminal needs to first perform voice recognition, and converts a voice into a Chinese character, Pinyin, or English form, for example, identifies the voice as a Chinese character, and then detects whether the identified Chinese character is a keyword in the keyword library. For example, meanings of identified Chinese characters are "telephone", "mobile number", and "number", and then, it is checked whether the three groups of Chinese characters are keywords in the keyword library. For another example, identified Pinyin is "dianhua" (telephone), "shoujihao" (mobile number), and "haoma" (number), and then, it is checked whether the three groups of Pinyin are keywords in the keyword library.

In a practical application, the object information includes invalid information at times. For example, for "the telephone number of Lao Wang", "Lao (Old)" in "Lao Wang" belongs to a qualifier. Therefore, to improve accuracy of the found target information, further, in this embodiment of the present disclosure, after the first terminal obtains the to-be-obtained information and the object information, and before the first terminal determines the group that is in any category and corresponding to the object to which the to-be-obtained information belongs, the following operation is further included:

The first terminal extracts valid information from the object information.

In this case, when the first terminal searches the information in the corresponding group in any category for the target information associated with the object information, optionally, the following operation may be used:

The first terminal searches the information in the corresponding group in any category for target information associated with the valid information.

Optionally, in this embodiment of the present disclosure, when the first terminal extracts the valid information from the object information, the following manner may be used:

The first terminal uses other information, except a qualifier, in the object information as the valid information.

For example, for a noun such as "Xiaoli", "Xiaoqiang", "Lao Wang", "Lao Zhang", or "Dabao", "Xiao (Little)" or "Lao (Old)" is generally a qualifier, and is not a character in a contact name. Therefore, if "Xiaoli" is directly searched for, a corresponding contact may not be found, and a searching failure is returned. A qualifier such as "Xiao (Little)", "Lao (Old)", or "Da (Big)" may be further removed, only a character/word behind is searched for, and the character/word behind the qualifier is used as the valid information. The target information associated with the valid information may be searched for in this way.

In this embodiment of the present disclosure, when the target information associated with the valid information is searched for, a relatively large amount of associated target information may be found. For example, after a qualifier "Lao (Old)" in "Lao Wang" is removed, valid information is "Wang", in this case, the target information may be all contacts with a surname of "Wang" in the address book, and there generally are a dozen or even dozens of contacts with a surname of "Wang. In this way, further searching still needs to be performed on these contacts with a surname of "Wang". Therefore, efficiency of searching for the target information is relatively low. In this case, the efficiency of searching for the target information may be improved with reference to a technical feature that the first terminal searches the information in the corresponding group in any category for the target information associated with the object information. Optionally, in this embodiment of the present disclosure, the group that is in any category of at least one category and corresponding to the object to which the to-be-obtained information belongs may be established in the following manners:

(1) Manual establishment: a contacts group is manually established. For example, contacts are classified into groups such as colleague, family, senior schoolmate, and college schoolmate.

(2) Automatic establishment: a corresponding group relationship is automatically led from a contacts list in a social APP such as, for example, WECHAT software or QQ software.

Optionally, in this embodiment of the present disclosure, when the first terminal processes the target information, the following manner may be used:

The first terminal prompts the target information, and sends the target information; or the first terminal determines an application corresponding to the target information, and operates, according to the target information, the determined application corresponding to the target information.

For example, if the target information is a mail address, the application corresponding to the target information is a "mail application", and then, the "mail application" is operated according to the found mail address.

Optionally, in this embodiment of the present disclosure, when the first terminal prompts the target information, the following manner may be used:

The first terminal determines an auxiliary device connected to the first terminal; and the first terminal prompts the target information on the auxiliary device.

Optionally, in this embodiment of the present disclosure, the auxiliary device may be a wearable device or an in-vehicle terminal.

In an example, the wearable device may be one or any combination of a smart watch, a smart band with a display function, or smart glasses. When the first terminal prompts the target information in the wearable device, the target information may be directly displayed in the wearable device.

In this embodiment of the present disclosure, to improve security of a user holding the second terminal, if the auxiliary device is a vehicle device, when the first terminal prompts the target information on the auxiliary device, optionally, the following manner may be used:

After determining that the call with the second terminal is ended, the first terminal prompts the target information on the auxiliary device by using voice information.

In this embodiment of the present disclosure, the first terminal sends the target information in multiple manners, and optionally, the following manner may be used:

The first terminal sends the target information in a preset sending manner. In this embodiment of the present disclosure, optionally, the sending manner is one or any combination of the following manners: an SMS manner, a mail manner, and an instant message manner.

Certainly, the preset sending manner may be included in the voice information of the second terminal, or may be a default sending manner. Details are not described herein.

In this embodiment of the present disclosure, optionally, an instant message refers to a message that may be exchanged on line in real time, for example, a QQ message, a WECHAT message, or a microblog message.

In this embodiment of the present disclosure, when sending the target information, the first terminal may send the target information to the second terminal or another terminal. When a target terminal is determined, the target terminal may be determined according to a keyword. After the target terminal is determined, a communication method with the target terminal is obtained, and then, a sending manner corresponding to the communication method is used for sending. The communication method may be the foregoing sending manner such as the SMS manner, the mail manner, or the instant message manner.

For example, when the keyword is any one of "send me (fageiwo), tell me (gaosuwo), or send (faguolai)", the second terminal is determined as the target terminal. When the keyword is any one of "send Xiaoliang (fageixiaoliang)" or "tell Xiaoliang (gaosuxiaoliang)", a third terminal corresponding to Xiaoliang is determined as the target terminal, and the mobile number of Xiaoliang is obtained from the address book and may be sent to the third terminal in an SMS message manner in this case. Alternatively, the QQ number of Xiaoliang is obtained from the address book and may be sent to the third terminal in a QQ message manner in this case.

In this embodiment of the present disclosure, optionally, if any category that is of the at least one category and to which the to-be-obtained information belongs is a picture category, when the first terminal searches the information in the corresponding group in any category for the target information associated with the object information, the following manner may be used:

The first terminal searches, by using a facial recognition technology, the information in the corresponding group in any category for the target information associated with the object information.

In this embodiment of the present disclosure, when the first terminal searches, by using the facial recognition technology, the information in the corresponding group in any category for the target information associated with the object information, optionally, the following manner may be used:

The first terminal searches, according to a time condition and/or a location condition by using the facial recognition technology, the information in the corresponding group in any category for the target information associated with the object information.

For example, if the voice information sent by the second terminal is "send me a photo of me that you took yesterday", it is determined that the first terminal has an image of the user of the second terminal, and then, the photo of the user holding the second terminal is determined from a photo library by using the facial recognition technology, and a photo taken yesterday is used as the target information.

In this embodiment of the present disclosure, when a picture is searched for in the photo library by using facial recognition technology, a basic picture of a target object is used, and then, each picture in the photo library is compared with the basic picture of the target object by using the facial recognition technology, so as to obtain the target information. Optionally, the basic picture of the target object may be a corresponding profile picture in the first terminal when a communication method of the target object is stored in the address book.

In this embodiment of the present disclosure, optionally, the object information is information about the contact corresponding to the second terminal and/or information about a contact corresponding to a third terminal.

In conclusion, in this embodiment of the present disclosure, a first terminal obtains, during a call with a second terminal by using voice information sent by the second terminal, to-be-obtained information and object information of an object to which the to-be-obtained information belongs; the first terminal determines at least one category to which the to-be-obtained information belongs; the first terminal determines a group that is in any category of at least one category and corresponding to the object to which the to-be-obtained information belongs; the first terminal searches information in the corresponding group in any category for target information associated with the object information; and the first terminal processes the target information, and no manual searching is performed. Therefore, disadvantages of relatively long duration and relatively low efficiency in a current information processing process are fixed.

Figure 2:
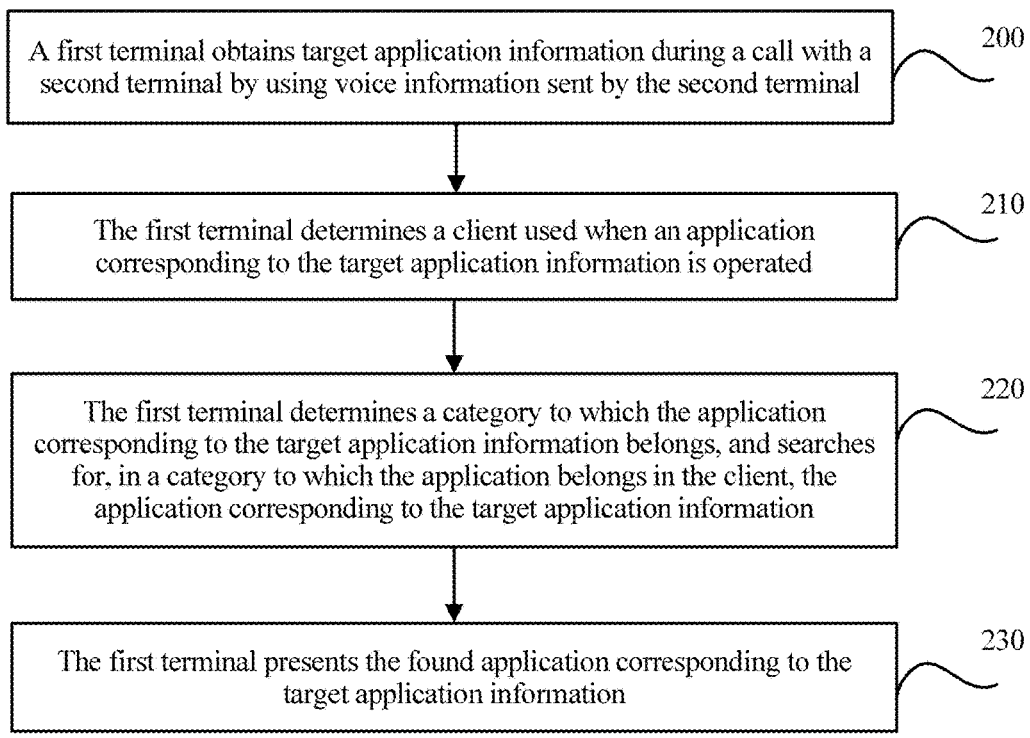
FIG. 2 is a flowchart of application presentation according to an embodiment of the present disclosure.

Referring to FIG. 2, in an embodiment of the present disclosure, an application presentation procedure is as follows:

Step 200: A first terminal obtains target application information during a call with a second terminal by using voice information sent by the second terminal.

Step 210: The first terminal determines a client used when an application corresponding to the target application information is operated.

Step 220: The first terminal determines a category to which the application corresponding to the target application information belongs, and searches for, in a category to which the application belongs in the client, the application corresponding to the target application information.

Step 230: The first terminal presents the found application corresponding to the target application information. Optionally, in this embodiment of the present disclosure, a procedure of step 200 to step 230 is not performed when the first terminal is in a call with the second terminal. In this way, the first terminal has a disadvantage of relatively large power consumption. Therefore, to reduce power consumption of the first terminal, in this embodiment of the present disclosure, the procedure of step 200 to step 230 is performed under triggering of a trigger condition.

Therefore, in this embodiment of the present disclosure, further, before the first terminal obtains the target application information by using the voice information sent by the second terminal, the following operation is further included:

The first terminal detects that the voice information sent by the second terminal includes at least one keyword in a preset keyword library.

That is, if the first terminal detects that the voice information sent by the second terminal includes the at least one keyword in the preset keyword library, the first terminal obtains the target application information according to the voice information of the second terminal. That is, that the first terminal detects that the voice information sent by the second terminal includes the at least one keyword in the preset keyword library is used as a trigger condition that the first terminal obtains the target application information according to the voice information of the second terminal.

For example, if the voice information of the second terminal is "XX is a new game, and you may download it for play", the first terminal enables a client, for example, an application store client, from which a target application "XX game" may be downloaded, searches for the target application "XX game" in a game category in the client, and then presents the found "XX game", so as to facilitate downloading or another operation.

In conclusion, in this embodiment of the present disclosure, a first terminal obtains target application information during a call with a second terminal by using voice information sent by the second terminal; the first terminal determines a client used when an application corresponding to the target application information is operated; the first terminal determines a category to which the application corresponding to the target application information belongs, and searches for, in a category to which the application belongs in the client, the application corresponding to the target application information; and the first terminal presents the found application corresponding to the target application information. In this solution, the client used when the application corresponding to the target application information is operated does not need to be manually searched for the application. Therefore, disadvantages of relatively long duration and relatively low efficiency in a current application presentation process are fixed.

Figure 3:
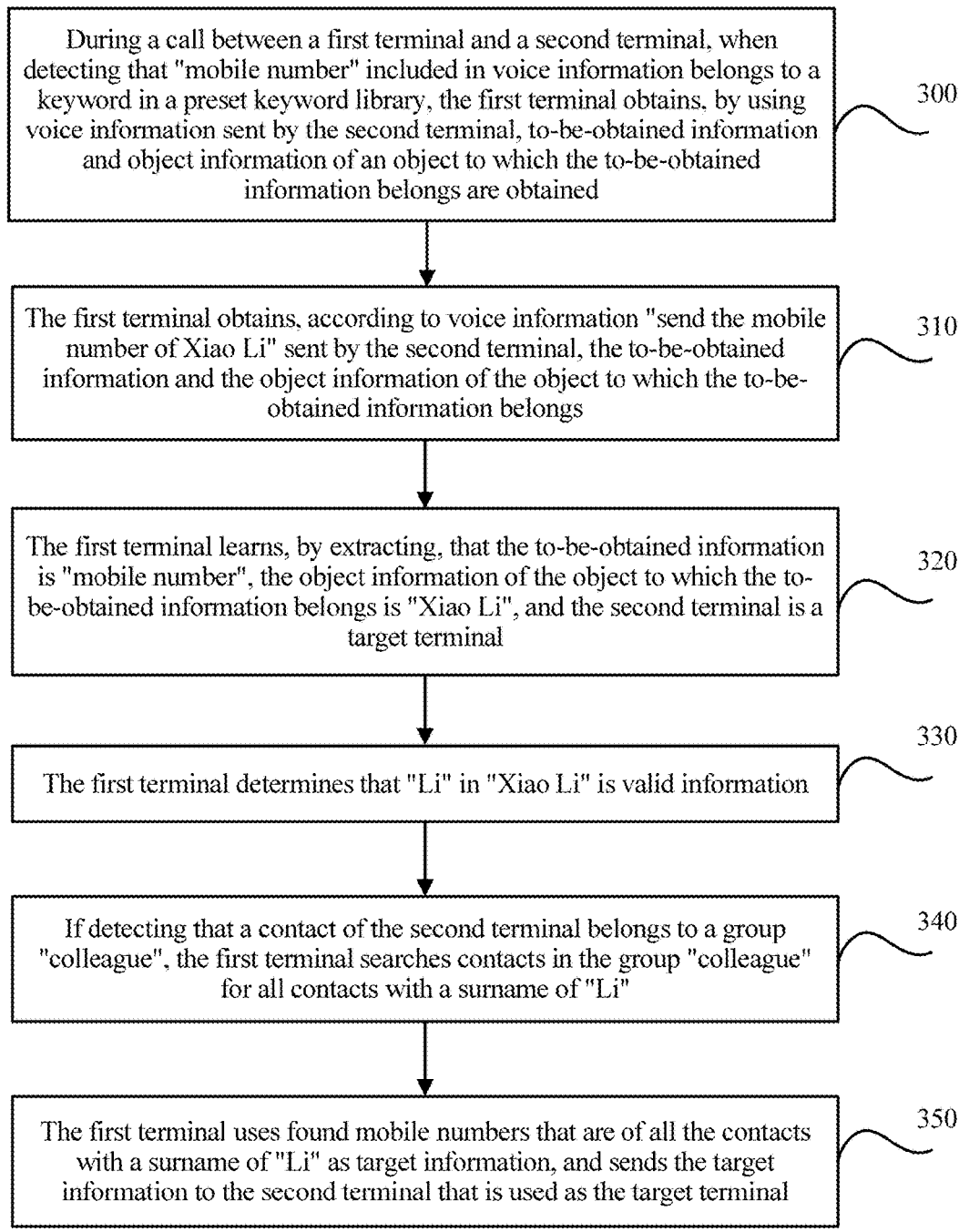
FIG. 3 shows an embodiment of information processing according to an embodiment of the present disclosure.

To better understand an embodiment of the present disclosure, by using an example in which to-be-obtained information is a mobile number, the following provides a specific application scenario, and provides further detailed description of an information processing process, as shown in FIG. 3.

Step 300: During a call between a first terminal and a second terminal, when detecting that "mobile number" included in voice information belongs to a keyword in a preset keyword library, the first terminal obtains, by using voice information sent by the second terminal, to-be-obtained information and object information of an object to which the to-be-obtained information belongs.

Step 310: The first terminal obtains, according to voice information "send the mobile number of Xiao Li" sent by the second terminal, the to-be-obtained information and the object information of the object to which the to-be-obtained information belongs.

Step 320: The first terminal learns, by extracting, that the to-be-obtained information is "mobile number", the object information of the object to which the to-be-obtained information belongs is "Xiao Li", and the second terminal is a target terminal.

Step 330: The first terminal determines that "Li" in "Xiao Li" is valid information.

Step 340: If detecting that a contact of the second terminal belongs to a group "colleague", the first terminal searches contacts in the group "colleague" for all contacts with a surname of "Li".

Step 350: The first terminal uses found mobile numbers of all the contacts with a surname of "Li" as target information, and sends the target information to the second terminal that is used as the target terminal.

Figure 4A:
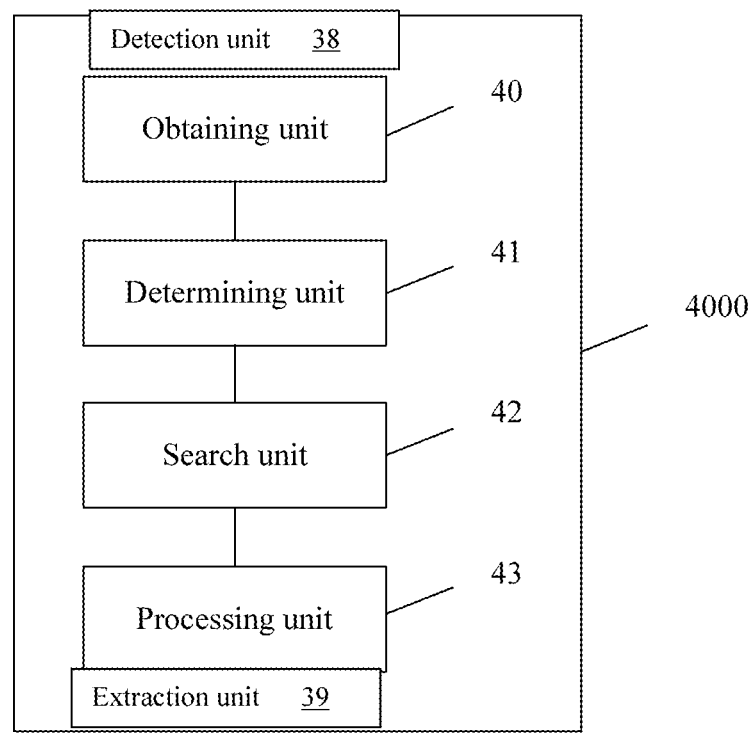
FIG. 4A is a schematic structural diagram of an information processing apparatus according to an embodiment of the present disclosure.

On the basis of the technical solutions of the foregoing corresponding methods, referring to FIG. 4A, FIG. 4A is a schematic structural diagram of an information processing apparatus 4000 according to an embodiment of the present disclosure. The information processing apparatus 4000 includes an obtaining unit 40, a determining unit 41, a search unit 42, and a processing unit 43.

The obtaining unit 40 is configured to obtain, during a call with a second terminal by using voice information sent by the second terminal, to-be-obtained information and object information of an object to which the to-be-obtained information belongs.

The determining unit 41 is configured to determine at least one category to which the to-be-obtained information belongs, and a group that is in any category of at least one category and corresponding to the object to which the to-be-obtained information belongs.

The search unit 42 is configured to search information in the corresponding group in any category for target information associated with the object information.

The processing unit 43 is configured to process the target information.

In this embodiment of the present disclosure, further, the information processing apparatus 4000 further includes a detection unit 38, where the detection unit is configured to detect that the voice information sent by the second terminal includes at least one keyword in a preset keyword library.

In this embodiment of the present disclosure, optionally, that the determining unit 41 determines the group that is in any category of at least one category and corresponds to the object to which the to-be-obtained information belongs includes using a group that is in any category and corresponds to a contact corresponding to the second terminal as the group that is in any category and corresponds to the object to which the to-be-obtained information belongs.

In this embodiment of the present disclosure, further, the information processing apparatus 4000 further includes an extraction unit 39, where the extraction unit is configured to extract valid information from the object information; and that the search unit 42 searches the information in the corresponding group in any category for the target information associated with the object information includes searching the information in the corresponding group in any category for target information associated with the valid information.

In this embodiment of the present disclosure, optionally, the extraction unit is configured to use other information, except a qualifier, in the object information as the valid information.

In this embodiment of the present disclosure, optionally, the processing unit 43 is configured to prompt the target information, and send the target information; or determine an application corresponding to the target information, and operate, according to the target information, the determined application corresponding to the target information.

In this embodiment of the present disclosure, optionally, that the processing unit 43 prompts the target information includes determining an auxiliary device connected to the first terminal; and prompting the target information on the auxiliary device.

In this embodiment of the present disclosure, further, if the auxiliary device is an in-vehicle terminal, the processing unit 43 is further configured to, after determining that the call with the second terminal is ended, prompt the target information on the auxiliary device by using voice information.

In this embodiment of the present disclosure, optionally, that the processing unit 43 sends the target information includes sending the target information in a preset sending manner.

In this embodiment of the present disclosure, optionally, the preset sending manner is one or any combination of the following manners: an SMS manner, a mail manner, and an instant message manner.

In this embodiment of the present disclosure, optionally, the search unit 42 is configured to, if any category is a picture category, search, by using a facial recognition technology, the information in the corresponding group in any category for the target information associated with the object information.

In this embodiment of the present disclosure, optionally, that the search unit 42 searches, by using the facial recognition technology, the information in the corresponding group in any category for the target information associated with the object information includes searching, according to a time condition and/or a location condition by using the facial recognition technology, the information in the corresponding group in any category for the target information associated with the object information.

In this embodiment of the present disclosure, optionally, the object information is information about the contact corresponding to the second terminal and/or information about a contact corresponding to a third terminal.

Figure 4B:
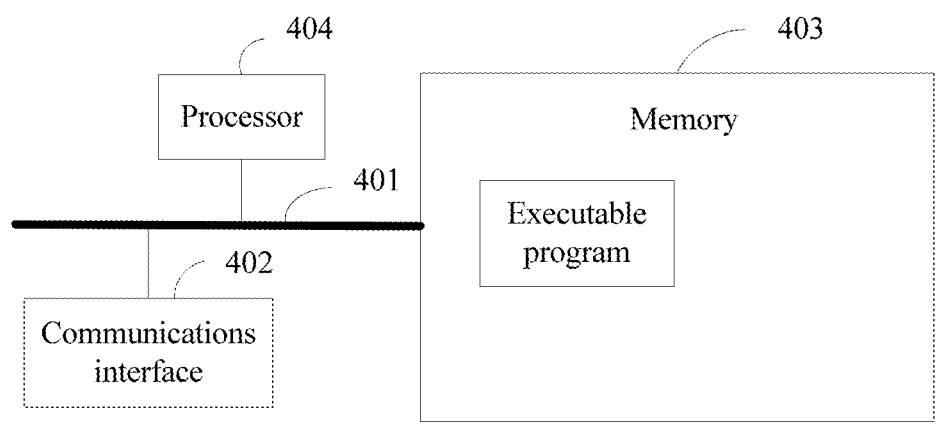
FIG. 4B is a schematic structural diagram of a terminal according to an embodiment of the present disclosure.

As shown in FIG. 4B, FIG. 4B is another schematic structural diagram of a terminal 4000 according to an embodiment of the present disclosure. The terminal 4000 includes a communications bus 401, at least one communications interface 402, a memory 403, and at least one processor 404.

The communications bus 401 is configured to implement connection and communication between the foregoing components.

Any communications interface 402 in the at least one communications interface 402 is configured to connect and communicate with a peripheral device.

The memory 403 is configured to store executable program code.

By executing the program code stored in the memory 403, the processor 404 is configured to obtain, during a call with a second terminal by using voice information sent by the second terminal, to-be-obtained information and object information of an object to which the to-be-obtained information belongs; determine at least one category to which the to-be-obtained information belongs; determine a group that is in any category of at least one category and corresponding to the object to which the to-be-obtained information belongs; search information in the corresponding group in any category for target information associated with the object information; and process the target information. Further, in this embodiment of the present disclosure, the processor 404 is further configured to detect that the voice information sent by the second terminal includes at least one keyword in a preset keyword library.

In this embodiment of the present disclosure, optionally, the processor 404 is configured to use a group that is in any category and corresponding to a contact corresponding to the second terminal as the group that is in any category and corresponding to the object to which the to-be-obtained information belongs.

Further, in this embodiment of the present disclosure, the processor 404 is further configured to extract valid information from the object information; and that the processor 404 searches the information in the corresponding group in any category for the target information associated with the object information includes searching the information in the corresponding group in any category for target information associated with the valid information.

Optionally, in this embodiment of the present disclosure, the processor 404 is configured to use other information, except a qualifier, in the object information as the valid information.

Optionally, in this embodiment of the present disclosure, the processor 404 is configured to prompt the target information, and send the target information; or determine an application corresponding to the target information, and operate, according to the target information, the determined application corresponding to the target information.

Optionally, in this embodiment of the present disclosure, the processor 404 is configured to determine an auxiliary device connected to the first terminal; and prompt the target information on the auxiliary device.

Further, in this embodiment of the present disclosure, if the auxiliary device is an in-vehicle terminal, the processing unit 404 is further configured to, after determining that the call with the second terminal is ended, prompt the target information on the auxiliary device by using voice information.

Optionally, in this embodiment of the present disclosure, the processor 404 is configured to send the target information in a preset sending manner.

Optionally, in this embodiment of the present disclosure, the preset sending manner is one or any combination of the following manners: an SMS manner, a mail manner, and an instant message manner.

Optionally, in this embodiment of the present disclosure, the processor 404 is configured to, if any category is a picture category, search, by using a facial recognition technology, the information in the corresponding group in any category for the target information associated with the object information.

Optionally, in this embodiment of the present disclosure, the processor 404 is configured to search, according to a time condition and/or a location condition by using the facial recognition technology, the information in the corresponding group in any category for the target information associated with the object information.

Optionally, in this embodiment of the present disclosure, the object information is information about the contact corresponding to the second terminal and/or information about a contact corresponding to a third terminal.

An embodiment of the present disclosure further provides a computer program product, where the computer program product includes a readable storage medium configured to store computer program code, the computer degree code runs on a processor, and the computer program code is used to obtain, during a call with a second terminal by using voice information sent by the second terminal, to-be-obtained information and object information of an object to which to-be-obtained information belongs; determine at least one category to which the to-be-obtained information belongs; determine a group that is in any category of at least one category and corresponding to the object to which the to-be-obtained information belongs; search information in the corresponding group in any category for target information associated with the object information; and process the target information.

In this embodiment of the present disclosure, optionally, a terminal 4000 may be a mobile terminal with a conversation function such as a mobile phone or a tablet.

Figure 5A:
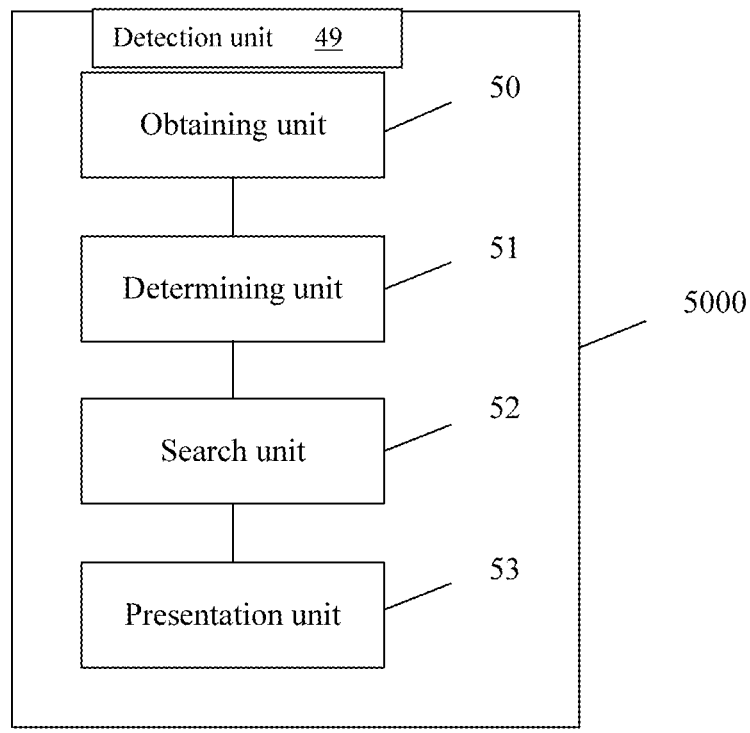
FIG. 5A is a schematic structural diagram of an application presentation apparatus according to an embodiment of the present disclosure.

On the basis of the technical solutions of the foregoing corresponding methods, referring to FIG. 5A, FIG. 5A is a schematic structural diagram of an application presentation apparatus 5000 according to an embodiment of the present disclosure. The application presentation apparatus 5000 includes an obtaining unit 50, a determining unit 51, a search unit 52, and a presentation unit 53.

The obtaining unit 50 is configured to obtain target application information during a call with a second terminal by using voice information sent by the second terminal.

The determining unit 51 is configured to determine a client used when an application corresponding to the target application information is operated.

The search unit 52 is configured to determine a category to which the application corresponding to the target application information belongs, and search for, in the category to which the application belongs in the client, the application corresponding to the target application information.

The presentation unit 53 is configured to present the found application corresponding to the target application information.

In this embodiment of the present disclosure, further, the application presentation apparatus 5000 further includes a detection unit 49, where the detection unit is configured to detect that the voice information sent by the second terminal includes at least one keyword in a preset keyword library.

Figure 5B:
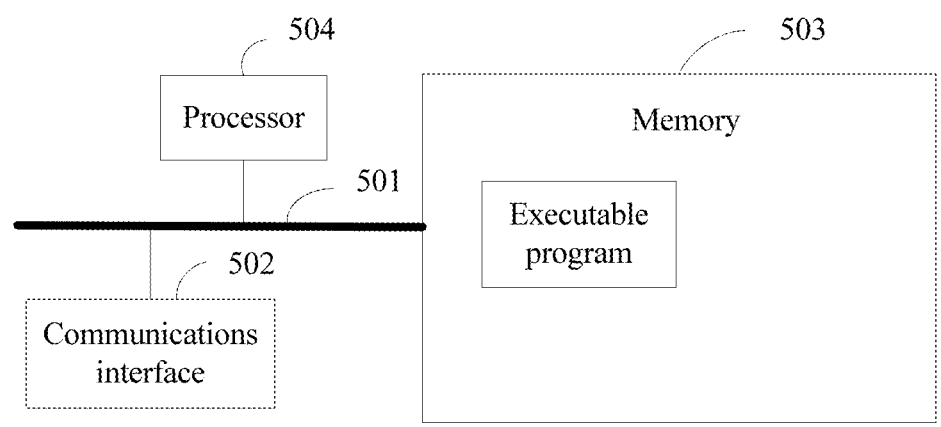
FIG. 5B is a schematic structural diagram of a terminal according to an embodiment of the present disclosure.

As shown in FIG. 5B, FIG. 5B is another schematic structural diagram of a terminal 5000 according to an embodiment of the present disclosure. The terminal 5000 includes a communications bus 501, at least one communications interface 502, a memory 503, and at least one processor 504.

The communications bus 501 is configured to implement connection and communication between the foregoing components.

Any communications interface 502 in the at least one communications interface 502 is configured to connect and communicate with a peripheral device.

The memory 503 is configured to store executable program code.

By executing the program code stored in the memory 503, the processor 504 is configured to obtain target application information during a call with a second terminal by using voice information sent by the second terminal; determine a client used when an application corresponding to the target application information is operated; determine a category to which the application corresponding to the target application information belongs, and search for, in the category to which the application belongs in the client, the application corresponding to the target application information; and present the found application corresponding to the target application information.

The processor 504 is further configured to, further, in this embodiment of the present disclosure, detect that the voice information sent by the second terminal includes at least one keyword in a preset keyword library.

In this embodiment of the present disclosure, optionally, the terminal 5000 may be a mobile terminal with a conversation function such as a mobile phone or a tablet.

An embodiment of the present disclosure further provides a computer program product, where the computer program product includes a readable storage medium configured to store computer program code, the computer degree code runs on a processor, and the computer program code is used to obtain target application information during a call with a second terminal by using voice information sent by the second terminal; determine a client used when an application corresponding to the target application information is operated; determine a category to which the application corresponding to the target application information belongs, and search for, in the category to which the application belongs in the client, the application corresponding to the target application information; and present the found application corresponding to the target application information.

Figure 6A:
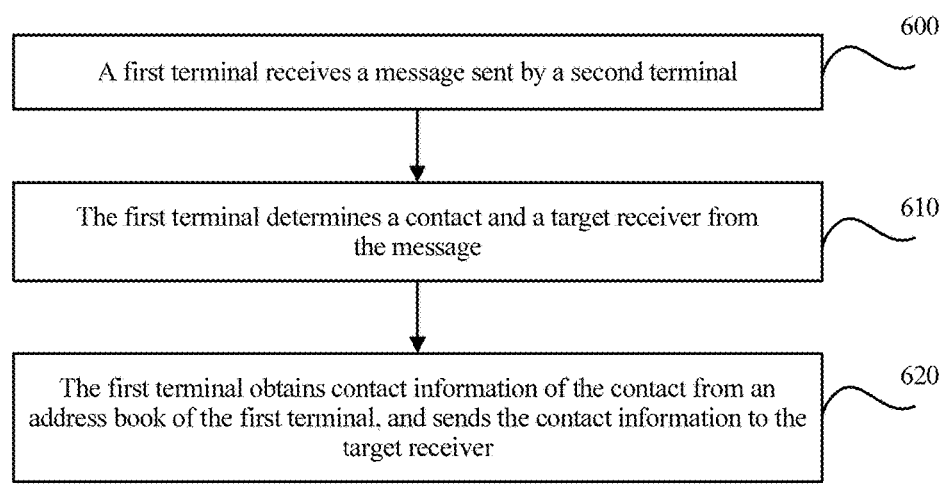
FIG. 6A is a schematic diagram of information sending according to an embodiment of the present disclosure.

Referring to FIG. 6A, an embodiment of the present disclosure further proposes an information sending method. A process of the method is as follows:

Step 600: A first terminal receives a message sent by a second terminal.

Step 610: The first terminal determines a contact and a target receiver from the message.

Step 620: The first terminal obtains contact information of the contact from an address book of the first terminal, and sends the contact information to the target receiver.

For example, a terminal A receives an SMS message sent by a terminal B, and the SMS message is "send the telephone number of Wang Hao to Sun Li". The terminal A determines, from the foregoing SMS message by means of semantic recognition, that the contact is "Wang Hao", the target receiver is "Sun Li". The terminal A learns, from the address book, that the telephone number of "Wang Hao" is 158XXXXX789 (where X represents numbers from 0 to 9 in the examples described herein), and sends a message including 158XXXXX789 to Sun Li. For example, the message sent to Sun Li may be "158XXXXX789", or may be "the telephone number of Wang Hao is 158XXXXX789".

In this embodiment of the present disclosure, optionally, the message may be an SMS message or an instant message (IM), or may be a mail.

Optionally, the instant message may be a message of QQ, WECHAT, iMessage® (iMessage is a registered trademark of Apple Inc.), or the like.

In this embodiment of the present disclosure, there are multiple types of the contact information, which may be optionally at least one of a telephone number, a social network account, or a contact address.

In this embodiment of the present disclosure, the telephone number may be a mobile number or a fixed-line phone number; the social network account may be a WECHAT number, a QQ number, or a microblog number; the contact address may be a mailbox/mail/Email address, or may be a home address/home address, or may be a company address, or the like.

In this embodiment of the present disclosure, the message sent by the second terminal may directly include the target receiver. For example, for "send the telephone number of Wang Hao to Sun Li", "Sun Li" is the target receiver. Certainly, the message may not include the target receiver either. For example, for "send the telephone number of Wang Hao", there is no target receiver in this case, and the second terminal may be directly used as the target receiver. Therefore, in this embodiment of the present disclosure, the first terminal may determine the target receiver according to the message in the following manners: if a keyword included in the message has a corresponding object, the first terminal determines the target receiver according to the object corresponding to the keyword; or if a keyword included in the message does not have a corresponding object, the first terminal uses the second terminal as the target receiver; where the keyword is a keyword used to represent a sending operation.

The keyword may be "send", "send", "send", "give", "tell", and the like.

In this embodiment of the present disclosure, when the message carries the object corresponding to the keyword, the object corresponding to the keyword may be an explicit receiver such as "Sun Li", "Sun Hao", or "Wang Hui", or may be a semi-explicit receiver such as "me", "him", or "her".

Therefore, in this embodiment of the present disclosure, when the first terminal determines the target receiver according to the object corresponding to the keyword, optionally, the following manner may be used:

If a target contact including valid information of the object is in contacts stored in the first terminal, the target contact is directly used as the target receiver; or if the object is "me", the first terminal uses the second terminal as the target receiver; or if the object is "him" or "her", the first terminal performs semantic analysis on a context message of the message, and determines the target receiver from the context message.

For example, for a message "tell me the telephone number of Xiaosheng", if the address book of the first terminal stores the telephone number of "Zhang Sheng", "Zhang Sheng" is used as the target receiver.

For another example, for a message "tell me the telephone number of Zhang Sheng", if the address book of the first terminal still stores the telephone number of "Zhang Sheng", "Zhang Sheng" is used as the target receiver.

For example, the first terminal sends an SMS message "send the telephone number of Sun Li to him" to the second terminal, the second terminal returns an SMS message "who is he" to the first terminal, and the first terminal then sends an SMS message "he is Wang Hui" to the second terminal. Although it cannot be determined, from the first message, who "he" is, it can be determined, according to the two subsequent messages, that "he" is Wang Hui.

In this embodiment of the present disclosure, a semantic analysis process includes lexical analysis (including word segmentation, part-of-speech tagging, and named entity recognition) and syntactic analysis, that is, by analyzing a dependence relationship among elements within a language unit, a syntactic structure of the language unit is revealed. Intuitively, grammatical elements such as "a subject, a predicate, and an object" and "an attribute, an adverbial, and a complement" in a sentence are identified depending on the syntactic analysis, and semantic analysis is performed according to a relationship among elements.

In this embodiment of the present disclosure, multiple target contacts may include the valid information of the object. For example, for a message "tell me the telephone number of Xiaoli", "li" is the valid information, and in this case, the target contacts include "Zhang Li", "Wang Li", "Li Li", and the like. In this case, the multiple target contacts may be all presented for manual selecting by a user.

In this embodiment of the present disclosure, after determining the contact information, the first terminal does not immediately send the contact information to the target receiver. To further improve user experience and improve sending accuracy, before the contact information is sent to the target receiver, the following operation is further included:

The first terminal presents the contact information.

In this way, the first terminal sends the contact information when receiving an instruction that instructs a user to perform an operation according to the presented contact information. Therefore, user experience and the sending accuracy are improved.

In this embodiment of the present disclosure, the first terminal presents the contact information in multiple manners, and optionally, the following manner may be used:

The first terminal presents the contact information in a suspend box, where the suspend box is suspended above an interface that presents the message; or the first terminal presents the contact information in a content editing box of an interface that presents the message.

Figure 6B:
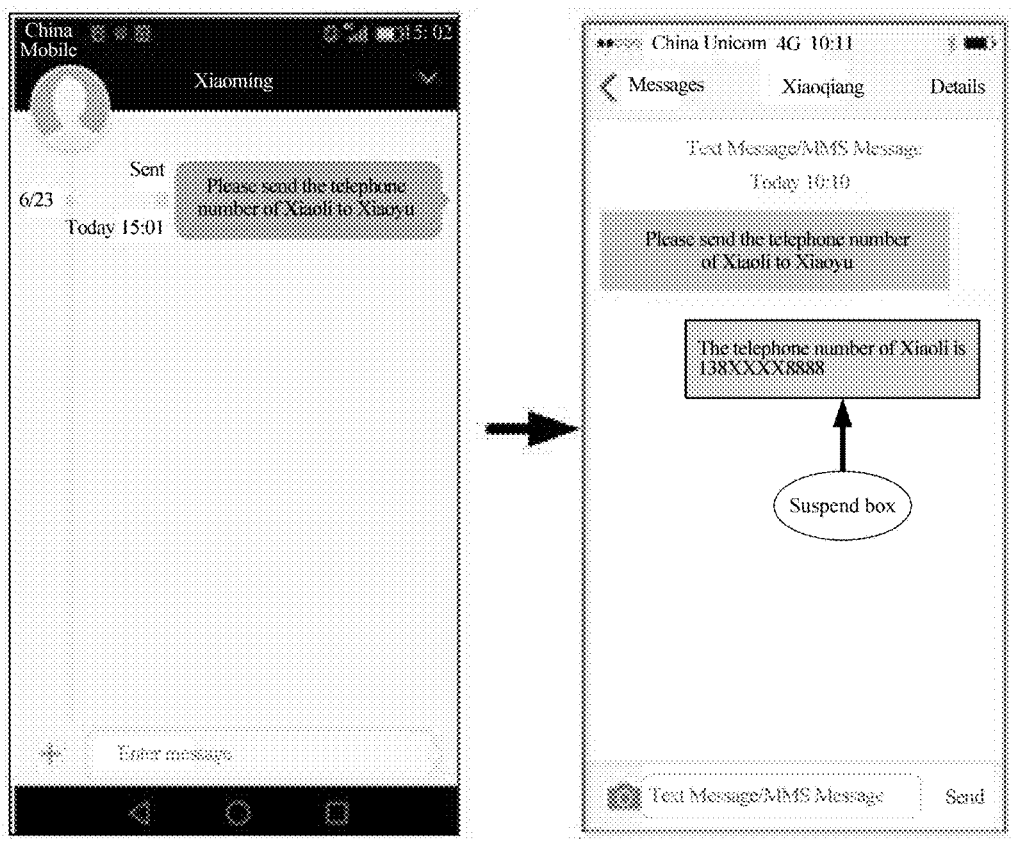
FIG. 6B is a schematic diagram of contact information presentation according to an embodiment of the present disclosure.

As shown in FIG. 6B, a graph on the left shows a first terminal held by Xiaoqiang, and a graph on the right shows a second terminal held by Xiaoming. The first terminal held by Xiaoqiang sends an SMS message "please send the telephone number of Xiaoli to Xiaoyu" to the second terminal held by Xiaoming. After receiving the SMS message, the second terminal presents the telephone number of Xiaoli in a suspend box form on an interaction interface between the second terminal and the first terminal.

Figure 6C:
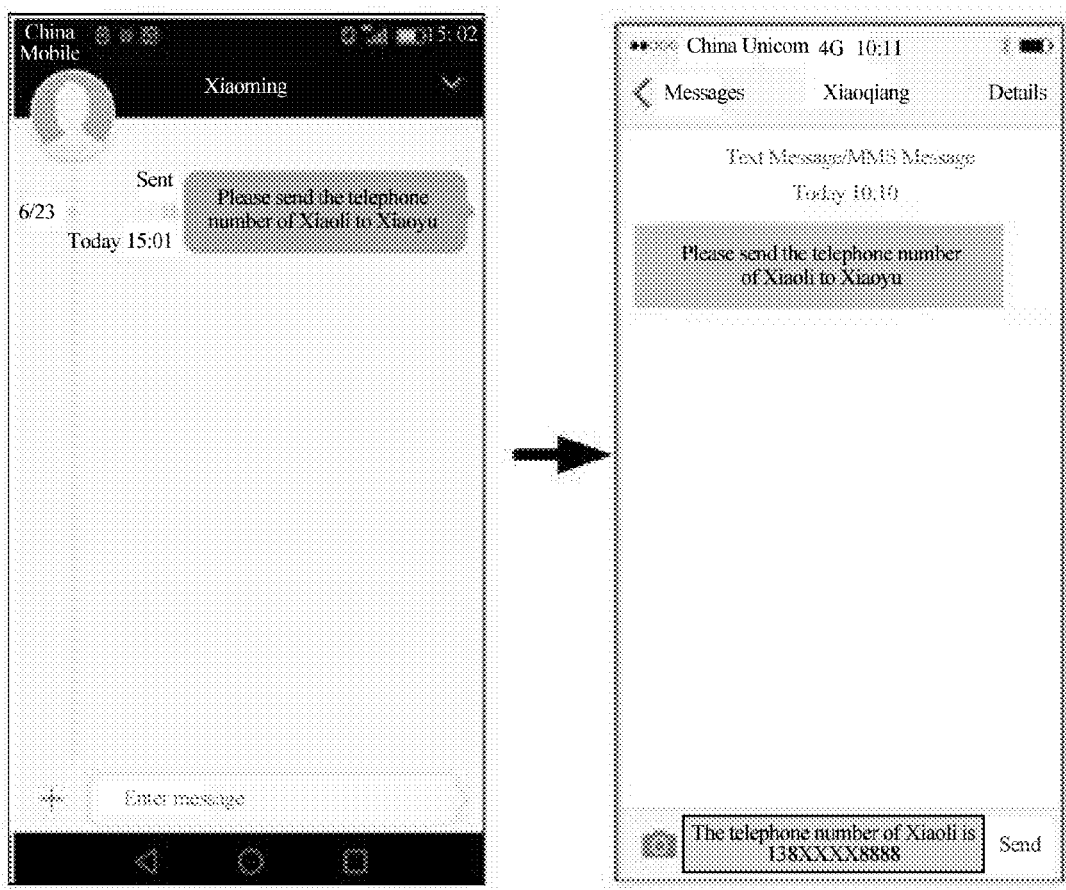
FIG. 6C is another schematic diagram of contact information presentation according to an embodiment of the present disclosure.

As shown in FIG. 6C, a graph on the left shows a first terminal held by Xiaoqiang, and a graph on the right shows a second terminal held by Xiaoming. The first terminal held by Xiaoqiang sends an SMS message "please send the telephone number of Xiaoli to Xiaoyu" to the second terminal held by Xiaoming. After receiving the SMS message, the second terminal presents the telephone number of Xiaoli on an interaction interface between the second terminal and the first terminal.

However, it should be noted that, when the contact information is presented in the content editing box of the interface that presents the message, the target receiver may be only the first terminal. However, when the contact information is presented in the suspend box, and the suspend box is suspended above the interface that presents the message, the target receiver may be the first terminal, or may be another terminal.

Optionally, a user of the second terminal may directly send the message by performing an upward flick operation on the suspend box, and may cancel, by performing a downward flick operation on the suspend box, sending the message. Optionally, when the user of the second terminal taps the suspend box, a prompt dialog box pops up to inquire whether the user determines to send the contact information or cancel sending the contact information.

Optionally, when the contact information is presented in a suspend box form, it may be further determined, by using a "send" key, to send content in the suspend box. Therefore, in this embodiment of the present disclosure, before the first terminal sends the contact information to the target receiver, the following operation is further included:

The first terminal suspends a sending shortcut button above the interface that presents the message.

In this case, when the first terminal sends the contact information to the target receiver, optionally, the following manner may be used:

When receiving an instruction to trigger the sending shortcut button, the first terminal sends the contact information in the suspend box to the target receiver.

Optionally, when the contact information is presented in a suspend box form, it may be further determined, by using a "cancel" key, to cancel sending content in the suspend box. Therefore, in this embodiment of the present disclosure, before the first terminal sends the contact information to the target receiver, the following operation is further included:

The first terminal suspends a canceling shortcut button above the interface that presents the message.

In this case, the following operation is further included:

When receiving an instruction to trigger the canceling shortcut button, the first terminal cancels the suspend box.

Figure 6D:
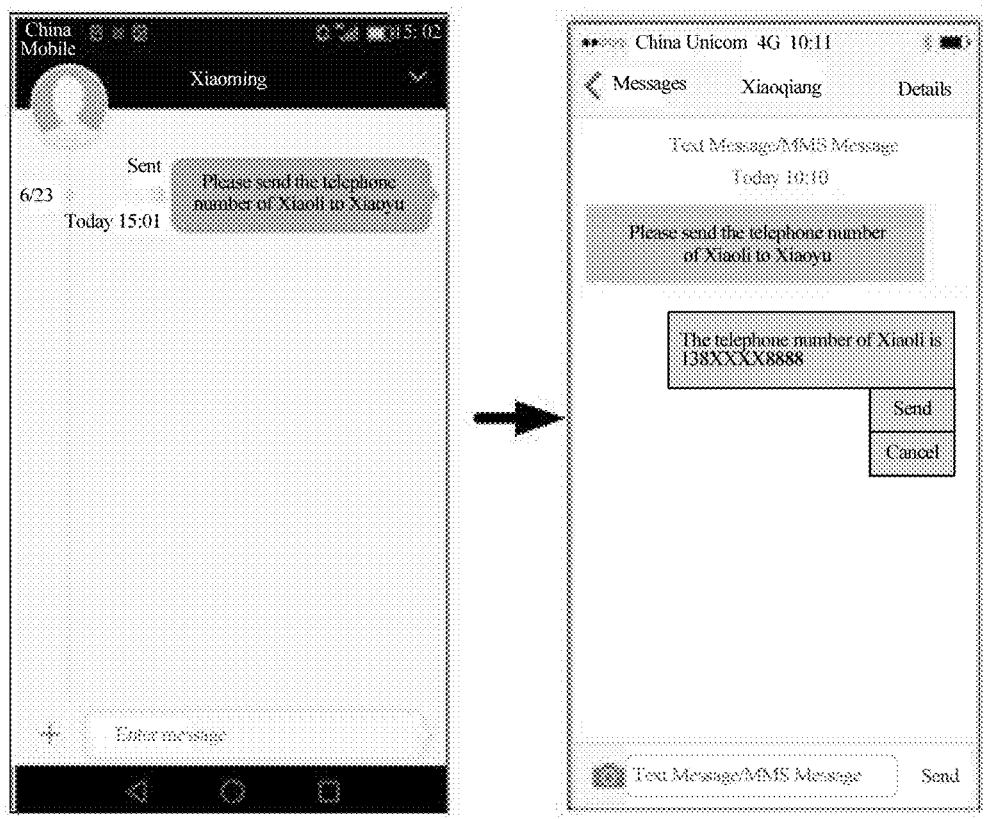
FIG. 6D is another schematic diagram of contact information presentation according to an embodiment of the present disclosure.

As shown in FIG. 6D, a graph on the left shows a first terminal held by Xiaoqiang, and a graph on the right shows a second terminal held by Xiaoming. For example, the first terminal held by Xiaoqiang sends an SMS message "please send the telephone number of Xiaoli to Xiaoyu" to the second terminal held by Xiaoming. After receiving the SMS message, the second terminal presents the telephone number of Xiaoli in a suspend box form on an interaction interface between the second terminal and the first terminal, and presents a sending shortcut button and a canceling shortcut button on the interface.

In this embodiment of the present disclosure, that the first terminal receives the instruction to trigger the sending shortcut button may include the first terminal that sends the contact information in the suspend box to the target receiver when receiving a tap operation performed by a user on the sending shortcut button.

Certainly, the target receiver may also be a third terminal besides the first terminal. Before presenting the contact information, the first terminal may jump from the interaction interface between the first terminal and the second terminal to an interaction interface between the first terminal and the third terminal.

Therefore, after the first terminal determines the contact information, and before the first terminal presents the contact information, the following operation is further included:

The first terminal jumps to an interaction interface between the first terminal and the target receiver from an interface that presents the message.

In this case, when the first terminal presents the contact information, optionally, the following manner may be used:

The first terminal presents the contact information in a suspend box, where the suspend box is suspended above the interaction interface between the first terminal and the target receiver; or the first terminal presents the contact information in a content editing box of the interaction interface between the first terminal and the target receiver.

Figure 6E:
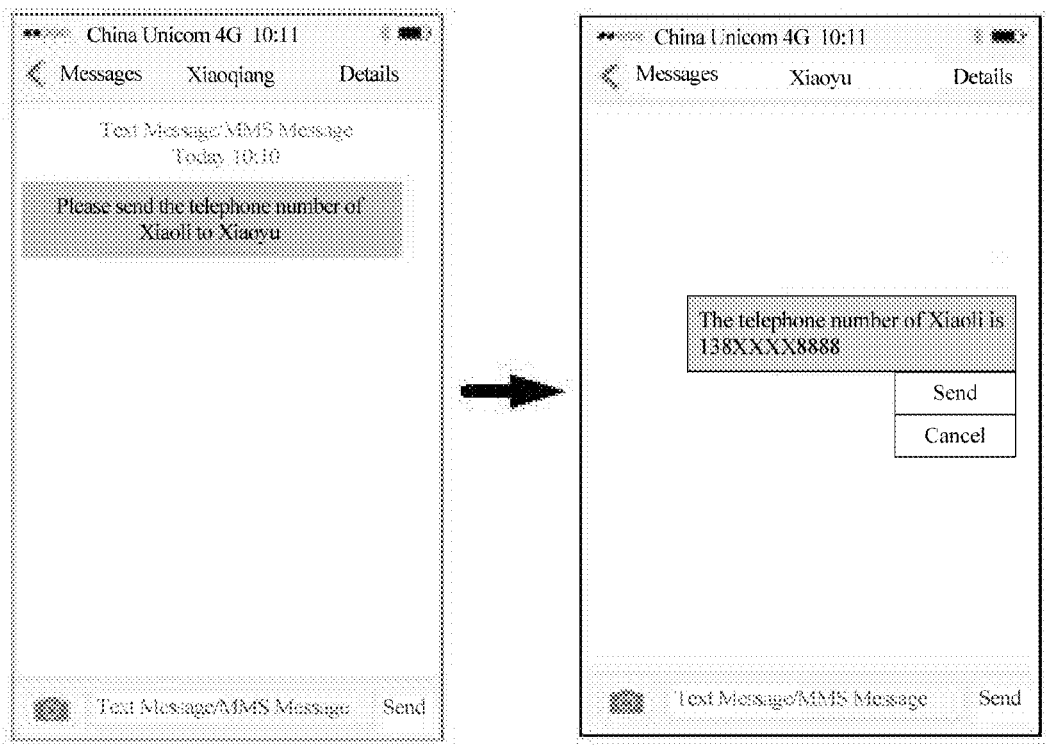
FIG. 6E is another schematic diagram of contact information presentation according to an embodiment of the present disclosure.

Referring to FIG. 6E, both a graph on the left and a graph on the right show a second terminal held by Xiaoming, the graph on the left is an interaction interface between the second terminal and a first terminal, and the graph on the right is an interaction interface between the second terminal and a third terminal. For example, the first terminal held by Xiaoqiang sends an SMS message "please send the telephone number of Xiaoli to Xiaoyu" to the second terminal held by Xiaoming. After receiving the message, the second terminal jumps to an interaction interface with the third terminal held by Xiaoyu, presents the telephone number of Xiaoli in a suspend box form on an interaction interface between the third terminal and the first terminal, and presents a sending shortcut button and a canceling shortcut button on the interface.

In examples, for whether the contact information is presented in a suspend box form or presented in a content editing box on the interaction interface between the first terminal and the third terminal, specific reference may be made to FIG. 6B and FIG. 6C.

In this embodiment of the present disclosure, before the first terminal sends the contact information to the target receiver, the following operation is further included:

The first terminal suspends a sending shortcut button above the interaction interface between the first terminal and the target receiver.

In this case, when the first terminal sends the contact information to the target receiver, optionally, the following manner may be used:

When receiving an instruction to trigger the sending shortcut button, the first terminal sends the contact information in the suspend box to the target receiver.

Certainly, the instruction to trigger the sending shortcut button may be a tap operation, or may be another operation. Details are not described herein.

Some terminals support a pop-up window SMS message currently, that is, when arriving, a new SMS message is directly displayed on a current interface by means of a pop-up window. Therefore, the solutions of the present disclosure are not only applicable to a scenario in which an "SMS message" application is enabled to check a new message, but also applicable to a scenario of a pop-up window SMS message.

For example, an SMS message received by the first terminal is "please tell me the telephone number of Xiaoli" and displayed in a pop-up window form. In this case, the first terminal obtains the telephone number of Xiaoli, and displays a suspend box next to an SMS message pop-up window. The telephone number of Xiaoli is presented in the suspend box, and in addition, a sending shortcut button and a canceling shortcut button are also displayed. Certainly, the obtained telephone number of Xiaoli may also be directly displayed in a content editing box of the pop-up window SMS message.

Figure 7:
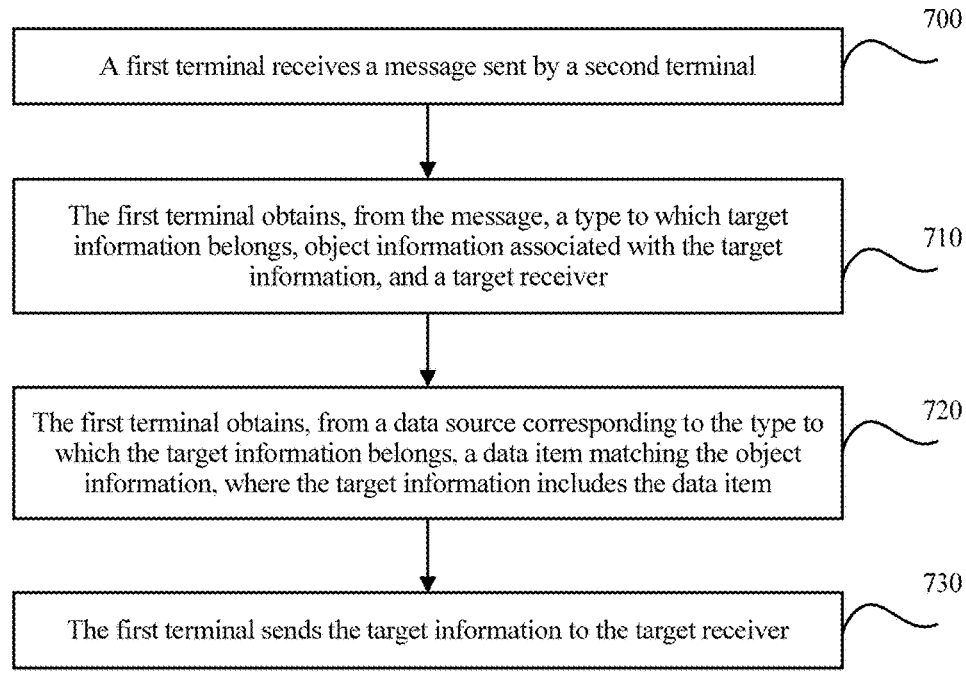
FIG. 7 is another schematic diagram of information sending according to an embodiment of the present disclosure.

Referring to FIG. 7, an embodiment of the present disclosure further proposes another information sending method. A procedure of the method is as follows:

Step 700: A first terminal receives a message sent by a second terminal.

Step 710: The first terminal obtains, from the message, a type to which target information belongs, object information associated with the target information, and a target receiver.

Step 720: The first terminal obtains, from a data source corresponding to the type to which the target information belongs, a data item matching the object information, where the target information includes the data item.

Step 730: The first terminal sends the target information to the target receiver.

In this embodiment of the present disclosure, when the first terminal obtains, from the message, the type to which the target information belongs, the object information associated with the target information, and the target receiver, optionally, the following manner may be used:

The first terminal performs semantic analysis on the message, and obtains the type to which the target information belongs, the object information, and the target receiver.

In this embodiment of the present disclosure, a semantic analysis process includes lexical analysis (including word segmentation, part-of-speech tagging, and named entity recognition) and syntactic analysis, that is, by analyzing a dependence relationship among elements within a language unit, a syntactic structure of the language unit is revealed. Intuitively, grammatical elements such as "a subject, a predicate, and an object" and "an attribute, an adverbial, and a complement" in a sentence are identified depending on the syntactic analysis, and semantic analysis is performed according to a relationship among elements.

In this embodiment of the present disclosure, the message sent by the second terminal may directly include the target receiver. For example, for "send the telephone number of Wang Hao to Sun Li", "Sun Li" is the target receiver. Certainly, the message may not include the target receiver either. For example, for "send the telephone number of Wang Hao", there is no target receiver in this case, and the second terminal may be directly used as the target receiver. Therefore, in this embodiment of the present disclosure, when the first terminal obtains the target receiver from the message, optionally, the following manner may be used: if a first-type keyword included in the message has a corresponding object, the first terminal determines the target receiver according to the object corresponding to the first-type keyword; or if a first-type keyword included in the message does not have a corresponding object, the first terminal uses the second terminal as the target receiver; where the first-type keyword is a keyword used to represent a sending operation.

The first-type keyword may be "send", "send", "send", "give", "tell", and the like.

For example, for a message "send the telephone number of Xiaoli to Xiaoyu", "send" is the first-type keyword, "Xiaoyu" is the object corresponding to the first-type keyword, and the first terminal determines the target receiver according to "Xiaoyu".

For another example, for a message "send the telephone number of Xaoli to him", "send" is the first-type keyword, "him" is the object corresponding to the first-type keyword, and the first terminal determines the target receiver according to "him".

For another example, for a message "send the telephone number of Xiaoli", "send" is the first-type keyword, the first-type keyword does not have the corresponding object, and the first terminal uses the second terminal as the target receiver.

In this embodiment of the present disclosure, multiple target contacts may include the valid information of the object. For example, for a message "tell me the telephone number of Xiaoli", "li" is the valid information, and in this case, the target contacts include "Zhang Li", "Wang Li", "Li Li", and the like. In this case, the multiple target contacts may be all presented for manual selecting by a user.

In this embodiment of the present disclosure, when the first terminal determines the target receiver according to the object corresponding to the first-type keyword, optionally, the following manner may be used: if a target object including valid information of the object corresponding to the first-type keyword is in objects stored in the first terminal, the target object is directly used as the target receiver; or if the object is "me", the first terminal uses the second terminal as the target receiver; or if the object is "him" or "her", the first terminal performs semantic analysis on a context message of the message, and determines the target receiver from the context message.

In a practical application, some information is not stored in the first terminal. To avoid a resource waste and an invalid operation, in this embodiment of the present disclosure, after the first terminal receives the message sent by the second terminal, and before first terminal obtains the type to which the target information belongs, the object information, and the target receiver, the following operation is further included:

The first terminal determines that the message includes at least one second-type keyword, where the second-type keyword is associated with at least one of a telephone number, a social network account, a bank account, a contact address, user information, a schedule, or multimedia content.

The telephone number may be a mobile number or a fixed-line phone number; the social network account may be a WECHAT number, a QQ number, or a microblog number; the contact address may be a mailbox/mail/Email address, or may be a home address/home address, or may be a company address; the multimedia content may be a photo, an App, news, a song, a movie, or the like.

That is, steps 710 to 730 are performed when the first terminal determines, after receiving the message, that the message includes the at least one second-type keyword. In this way, an invalid obtaining operation can be prevented, and resource utilization can be improved.

In actual application, the message received by the first terminal includes the at least one second-type keyword. However, the message is only used to state a thing, but not used to request information. For example, for a message "the telephone number of Wang Hao is 158XXXXXX109" sent by the second terminal, although a second-type keyword of "the telephone number" is included, the message is used to state a fact what the telephone number of Wang Hao is, but not used to request to obtain the telephone number of Wang Hao. Therefore, in this embodiment of the present disclosure, after the first terminal determines the at least one second-type keyword, and before the first terminal obtains the type to which the target information belongs, the object information, and the target receiver, the following operation is further included:

The first terminal determines that the message includes at least one third-type keyword, where the third-type keyword is a keyword used to represent that the message has a request intention.

For example, "please tell me the telephone number of Xiaoli"; "please send me the telephone number of Xiaoli"; "please send me the Email of Xiaoli"; "I want the telephone number of Xiaoli"; "please send me your bank account"; "what is the mobile number of Xiaoming"; "what is the WECHAT number of Xiaoli"; "what is your QQ number"; "what is your fixed-line phone number"; "what is your bank account"; "what is your company address"; "what is your mail address".

In the foregoing examples, "tell me", "send me", "want", "send me", "what is", and "what is" are third-type keywords.

In this embodiment of the present disclosure, to improve user experience, after being determined, a target message is not immediately sent, but needs to be presented, and then is sent according to a corresponding instruction. Therefore, after the first terminal determines the target information, and before the first terminal sends the target information to the target receiver, the following operation is further included:

The first terminal presents the target information.

In this way, the first terminal sends the contact information when receiving an instruction that instructs a user to perform an operation according to the presented contact information. Therefore, user experience and sending accuracy are improved.

In this embodiment of the present disclosure, the first terminal presents the target information in multiple manners, and optionally, the following manner may be used:

The first terminal presents the target information in a suspend box, where the suspend box is suspended above an interface that presents the message; or the first terminal presents the target information in a content editing box of an interface that presents the message.

For presentation of the target information in the suspend box, reference may be made to FIG. 6B, and for presentation of the target information in the content editing box, reference may be made to FIG. 6C.

Optionally, a user of the second terminal may directly send the message by performing an upward flick operation on the suspend box, and may cancel, by performing a downward flick operation on the suspend box, sending the message. Optionally, when the user of the second terminal taps the suspend box, a prompt dialog box pops up to inquire whether the user determines to send the target message or cancel sending the target message.

Optionally, when the contact information is presented in a suspend box form, it may be further determined, by using a "send" key, to send content in the suspend box. Therefore, in this embodiment of the present disclosure, before the first terminal sends the target information to the target receiver, the following operation is further included:

The first terminal suspends a sending shortcut button above the interface that presents the message.

In this case, when the first terminal sends the target information to the target receiver, optionally, the following manner may be used:

When receiving an instruction to trigger the sending shortcut button, the first terminal sends the target information in the suspend box to the target receiver.

Optionally, when the contact information is presented in a suspend box form, it may be further determined, by using a "cancel" key, to cancel sending content in the suspend box. Therefore, in this embodiment of the present disclosure, before the first terminal sends the contact information to the target receiver, the following operation is further included:

The first terminal suspends a canceling shortcut button above the interface that presents the message.

In this case, the following operation is further included:

When receiving an instruction to trigger the canceling shortcut button, the first terminal cancels the suspend box.

As shown in FIG. 6D, a graph on the left shows first terminal held by Xiaoqiang, and a graph on the right shows a second terminal held by Xiaoming. For example, the first terminal held by Xiaoqiang sends an SMS message "please send the telephone number of Xiaoli to Xiaoyu" to the second terminal held by Xiaoming. After receiving the SMS message, the second terminal presents the telephone number of Xiaoli in a suspend box form on an interaction interface between the second terminal and the first terminal, and presents a sending shortcut button and a canceling shortcut button on the interface.

In this embodiment of the present disclosure, that the first terminal receives the instruction to trigger the sending shortcut button may include the first terminal that sends the contact information in the suspend box to the target receiver when receiving a tap operation performed by a user on the sending shortcut button.

In this embodiment of the present disclosure, that the first terminal receives the instruction to trigger the sending shortcut button may include the first terminal that sends the contact information in the suspend box to the target receiver when receiving a tap operation performed by a user on the sending shortcut button.

Certainly, the target receiver may also be a third terminal besides the first terminal. Before presenting the contact information, the first terminal may jump from the interaction interface between the first terminal and the second terminal to an interaction interface between the first terminal and the third terminal.

Therefore, in this embodiment of the present disclosure, after the first terminal determines the target receiver of the target information, and before the first terminal presents the target information, the following operation is further included:

The first terminal jumps to an interaction interface between the first terminal and the target receiver from an interface that presents the message.

In this case, when the first terminal presents the target information, optionally, the following manner may be used:

The first terminal presents the target information in a suspend box, where the suspend box is suspended above the interaction interface between the first terminal and the target receiver; or the first terminal presents the target information in a content editing box of the interaction interface between the first terminal and the target receiver.

Likewise, in this embodiment of the present disclosure, before the first terminal sends the target information to the target receiver, the following operation is further included:

The first terminal suspends a sending shortcut button above the interaction interface between the first terminal and the target receiver.

In this case, that the first terminal sends the target information to the target receiver includes, when receiving an instruction to trigger the sending shortcut button, the first terminal that sends the target information in the suspend box to the target receiver.

In this embodiment of the present disclosure, the first terminal sends the target information to the target receiver in multiple manners, and optionally, the following manners may be used: if the message is an SMS message, and a media type of the target information is text, the first terminal sends the target information to the target receiver in an SMS message manner; if the message is an SMS message, and a media type of the target information is a multimedia format, the first terminal sends the target information to the target receiver in an instant message manner or in an MMS message manner; if the message is an instant message, the first terminal sends the target information to the target receiver in an instant message manner; and if the message is received in a mail manner, the first terminal sends the target information to the target receiver in a mail manner.

In this embodiment of the present disclosure, when the first terminal obtains, from the data source corresponding to the type to which the target information belongs, the data item matching the object information, optionally may include, if the type to which the target information belongs is a picture, the first terminal that searches a photo album for the target information by using a facial recognition technology.

In this embodiment of the present disclosure, optionally, the message is at least one of an SMS message, an instant message, or a mail.

In this embodiment of the present disclosure, the data source may be in the following form, for example, may be an address book, or may be a notepad, or may be a schedule, or may be a photo album, or may be a folder, or may be an APP. When a picture or photo is to be obtained, the photo album needs to be searched. For another example, when the APP is to be obtained, an application store needs to be searched.

To improve security, when the first terminal receives the message sent by the second terminal, a subsequent operation is performed when an identity of the second terminal is authenticated, and it is determined that related information of the second terminal is stored in the first terminal.

Some terminals support a pop-up window SMS message currently, that is, when arriving, a new SMS message is directly displayed on a current interface by means of a pop-up window. Therefore, the solutions of the present disclosure are not only applicable to a scenario in which an "SMS message" application is enabled to check a new message, but also applicable to a scenario of a pop-up window SMS message.

For example, an SMS message received by the first terminal is "please tell me the telephone number of Xiaoli" and displayed in a pop-up window form. In this case, the first terminal obtains the telephone number of Xiaoli, and displays a suspend box next to an SMS message pop-up window. The telephone number of Xiaoli is presented in the suspend box, and in addition, a sending shortcut button and a canceling shortcut button are also displayed. Certainly, the obtained telephone number of Xiaoli may also be directly displayed in a content editing box of the pop-up window SMS message.

Figure 8A:
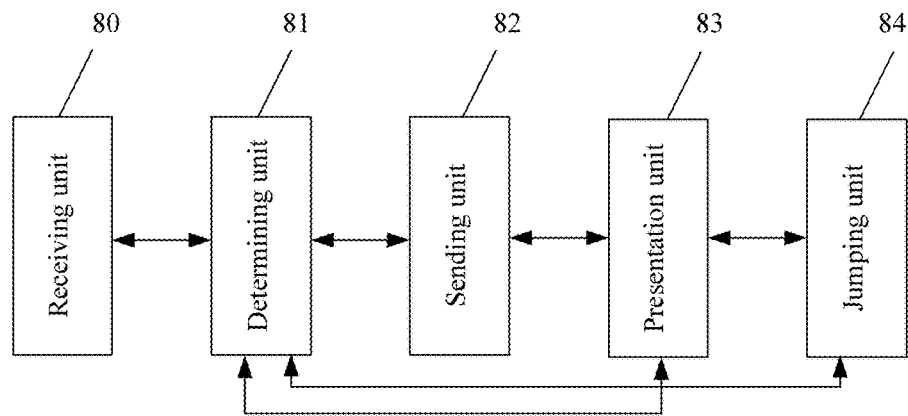
FIG. 8A is a schematic diagram of a first terminal according to an embodiment of the present disclosure.

Referring to FIG. 8A, an embodiment of the present disclosure proposes a first terminal, including a receiving unit 80, a determining unit 81, and a sending unit 82.

The receiving unit 80 is configured to receive a message sent by a second terminal.

The determining unit 81 is configured to determine a contact and a target receiver from the message.

The receiving unit 80 is further configured to obtain contact information of the contact from an address book of the first terminal.

The sending unit 82 is configured to send the contact information to the target receiver.

Optionally, the contact information includes at least one of a telephone number, a social network account, or a contact address.

Optionally, that the determining unit 81 determines the target receiver from the message includes, if a keyword included in the message has a corresponding object, the determining unit 81 that determines the target receiver according to the object corresponding to the keyword; or if a keyword included in the message does not have a corresponding object, the determining unit 81 that uses the second terminal as the target receiver; where the keyword is a keyword used to represent a sending operation.

Optionally, that the determining unit 81 determines the target receiver according to the object corresponding to the keyword includes, if a target contact including valid information of the object is in contacts stored in the first terminal, directly using the target contact as the target receiver; or if the object is "me", the determining unit 81 uses the second terminal as the target receiver; or if the object is "him" or "her", the determining unit 81 performs semantic analysis on a context message of the message, and determines the target receiver from the context message.

Further, the first terminal further includes a presentation unit 83 configured to present the contact information.

Optionally, that the presentation unit 83 presents the contact information includes the presentation unit 83 that presents the contact information in a suspend box, where the suspend box is suspended above an interface that presents the message; or the presentation unit 83 that presents the contact information in a content editing box of an interface that presents the message.

Further, the presentation unit 83 is further configured to suspend a sending shortcut button above the interface that presents the message; the receiving unit 80 is further configured to receive an instruction to trigger the sending shortcut button; and that the sending unit 82 sends the contact information to the target receiver includes, when the receiving unit 80 receives the instruction to trigger the sending shortcut button, the sending unit 82 that sends the contact information in the suspend box to the target receiver.

Further, the first terminal further includes a jumping unit 84 configured to jump to an interaction interface between the first terminal and the target receiver from an interface that presents the message; where that the presentation unit 83 presents the contact information includes the presentation unit 83 that presents the contact information in a suspend box, where the suspend box is suspended above the interaction interface between the first terminal and the target receiver; or the presentation unit 83 that presents the contact information in a content editing box of the interaction interface between the first terminal and the target receiver.

Further, the presentation unit 83 is further configured to suspend a sending shortcut button above the interaction interface between the first terminal and the target receiver; the receiving unit 80 is further configured to receive an instruction to trigger the sending shortcut button; and that the sending unit 82 sends the contact information to the target receiver includes, when the receiving unit 80 receives the instruction to trigger the sending shortcut button, the sending unit 82 that sends the contact information in the suspend box to the target receiver.

Figure 8B:
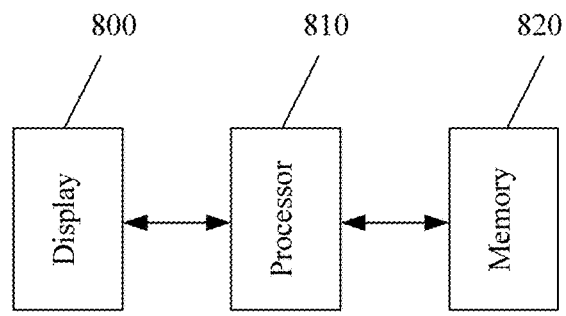
FIG. 8B is another schematic diagram of a first terminal according to an embodiment of the present disclosure.

Referring to FIG. 8B, an embodiment of the present disclosure further proposes a portable electronic device, including a display 800, where the display 800 includes a touch-sensitive surface and a display screen; one or more processors 810; a memory 820; and one or more programs, where the one or more programs are stored in the memory 820 and are configured to be executed by the one or more processors 810, and the one or more programs include an instruction used to execute the method according to steps 600 to 620.

An embodiment of the present disclosure further proposes a portable electronic device, including a computer readable storage medium storing one or more programs, where the one or more programs include an instruction, when being executed by the portable electronic device including a display and multiple application programs, the instruction makes the portable electronic device execute the method according to steps 600 to 620, and the display includes a touch-sensitive surface and a display screen.

Figure 9A:
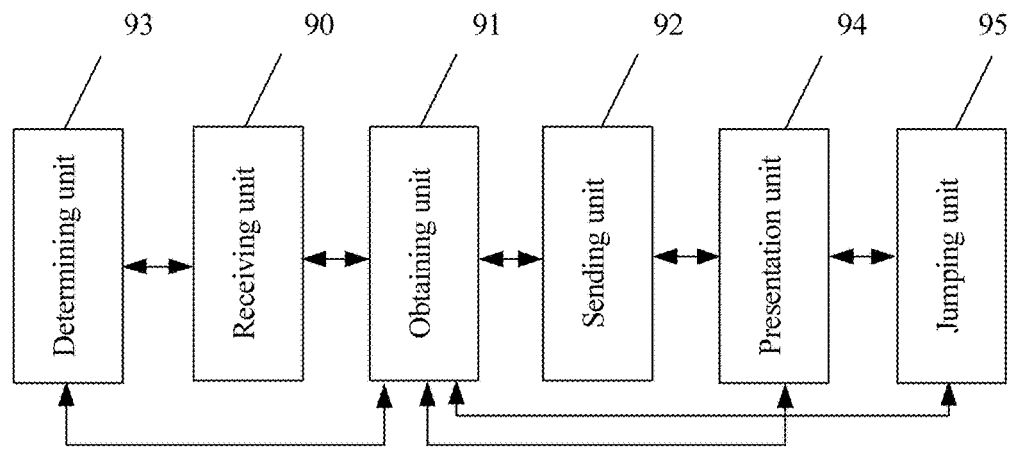
FIG. 9A is another schematic diagram of a first terminal according to an embodiment of the present disclosure.

Referring to FIG. 9, an embodiment of the present disclosure further proposes another first terminal, including a receiving unit 90, an obtaining unit 91, and a sending unit 92; where the receiving unit 90 is configured to receive a message sent by a second terminal; the obtaining unit 91 is configured to obtain, from the message, a type to which target information belongs, object information associated with the target information, and a target receiver; where the obtaining unit 91 is further configured to obtain, from a data source corresponding to the type to which the target information belongs, a data item matching the object information, where the target information includes the data item; and the sending unit 92 is configured to send the target information to the target receiver.

Optionally, that the obtaining unit 91 obtains, from the message, the type to which the target information belongs, the object information associated with the target information, and the target receiver includes the obtaining unit 91 that performs semantic analysis on the message, and obtains the type to which the target information belongs, the object information, and the target receiver.

Optionally, that the obtaining unit 91 obtains the target receiver from the message includes, if a first-type keyword included in the message has a corresponding object, the obtaining unit 91 that determines the target receiver according to the object corresponding to the first-type keyword; or if a first-type keyword included in the message does not have a corresponding object, the obtaining unit 91 that uses the second terminal as the target receiver; where the first-type keyword is a keyword used to represent a sending operation.

Optionally, that the obtaining unit 91 determines the target receiver according to the object corresponding to the first-type keyword includes, if a target object including valid information of the object corresponding to the first-type keyword is in objects stored in the first terminal, the obtaining unit 91 that directly uses the target object as the target receiver; or if the object is "me", the obtaining unit 91 that uses the second terminal as the target receiver; or if the object is "him" or "her", the obtaining unit 91 that performs semantic analysis on a context message of the message, and determines the target receiver from the context message.

Further, the first terminal further includes a determining unit 93 configured to determine that the message includes at least one second-type keyword, where the second-type keyword is associated with at least one of a telephone number, a social network account, a bank account, a contact address, user information, a schedule, or multimedia content.

Further, the determining unit 93 is further configured to determine that the message includes at least one third-type keyword, where the third-type keyword is a keyword used to represent that the message has a request intention.

Further, the first terminal further includes a presentation unit 94 configured to present the target information.

Optionally, that the presentation unit 94 presents the target information includes presenting the target information in a suspend box, where the suspend box is suspended above an interface that presents the message; or presenting the target information in a content editing box of an interface that presents the message.

Further, the presentation unit 94 is further configured to suspend a sending shortcut button above the interface that presents the message; the receiving unit 90 is further configured to receive an instruction to trigger the sending shortcut button; and that the sending unit 92 sends the target information to the target receiver includes, when the receiving unit 90 receives the instruction to trigger the sending shortcut button, the sending unit 92 that sends the target information in the suspend box to the target receiver.

Further, the first terminal further includes a jumping unit 95 configured to jump to an interaction interface between the first terminal and the target receiver from an interface that presents the message; where that the presentation unit 94 presents the target information includes the presentation unit 94 that presents the target information in a suspend box, where the suspend box is suspended above the interaction interface between the first terminal and the target receiver; or the presentation unit 94 that presents the target information in a content editing box of the interaction interface between the first terminal and the target receiver.

Further, the presentation unit 94 is further configured to suspend a sending shortcut button above the interaction interface between the first terminal and the target receiver; the receiving unit 90 is further configured to receive an instruction to trigger the sending shortcut button; and that the sending unit 92 sends the target information to the target receiver includes, when the instruction to trigger the sending shortcut button is received, sending the target information in the suspend box to the target receiver.

Optionally, that the sending unit 92 sends the target information to the target receiver includes, if the message is an SMS message, and a media type of the target information is text, the sending unit 92 that sends the target information to the target receiver in an SMS message manner; if the message is an SMS message and a media type of the target information is a multimedia format, the sending unit 92 that sends the target information to the target receiver in an instant message manner or in an MMS message manner; if the message is an instant message the sending unit 92 that sends the target information to the target receiver in an instant message manner; or if the message is received in a mail manner, the sending unit 92 that sends the target information to the target receiver in a mail manner.

Optionally, that the obtaining unit 91 obtains, from the data source corresponding to the type to which the target information belongs, the data item matching the object information includes, if the type to which the target information belongs is a picture, the obtaining unit 91 that searches a photo album for the target information by using a facial recognition technology.

Optionally, the message is at least one of an SMS message, an instant message, or a mail.

Figure 9B:
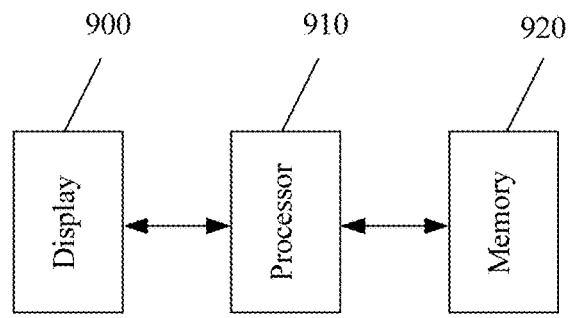
FIG. 9B is another schematic diagram of a first terminal according to an embodiment of the present disclosure.

Referring to FIG. 9B, an embodiment of the present disclosure further proposes a portable electronic device, including a display 900, where the display 900 includes a touch-sensitive surface and a display screen; one or more processors 910; a memory 920; and one or more programs, where the one or more programs are stored in the memory 920 and are configured to be executed by the one or more processors 910, and the one or more programs include an instruction used to execute the method according to steps 700 to 730.

An embodiment of the present disclosure further proposes a portable electronic device, including a computer readable storage medium storing one or more programs, where the one or more programs include an instruction, when being executed by the portable electronic device including a display and multiple application programs, the instruction makes the portable electronic device execute the method according to steps 700 to 730, and the display includes a touch-sensitive surface and a display screen.

The present disclosure is described with reference to the flowcharts and/or block diagrams of the method, the device or system, and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. An information processing method, comprising:
receiving, by a first terminal, voice information from a second terminal;
identifying, in the received voice information, to-be-obtained information of an object and object information associated with the object, the object being a user name;
determining, by the first terminal, at least one category of the to-be-obtained information;
determining, by the first terminal, a first group name of a first group in the second terminal that includes contact information of a user associated with the second terminal;
determining, by the first terminal, a second group name of a second group in any category in the first terminal that corresponds to the object, the second group name matching the first group name;
searching, by the first terminal according to the second group name, the second group that corresponds to the object for target information associated with the object information; and
processing, by the first terminal, the target information.

2. The method of claim 1, further comprising detecting, by the first terminal, whether a keyword in the voice information matches at least one keyword in a preset keyword library.

3. The method of claim 1, wherein determining, by the first terminal, the second group name corresponding to the object comprises using, by the first terminal, the first group name as the second group name to search the second group.

4. The method of claim 1, further comprising extracting, by the first terminal, valid information from the object information, and searching, by the first terminal, the second group comprising searching, by the first terminal, by using searchable textual information in the second group in any category for the target information associated with the valid information.

5. The method of claim 4, further comprising:
determining, by the first terminal, an auxiliary device connected to the first terminal; and
prompting, by the first terminal, the target information on the auxiliary device.

6. The method of claim 5, further comprising prompting, by the first terminal, the target information on the auxiliary device using the voice information when the auxiliary device is an in-vehicle terminal.

7. A terminal, comprising:
a memory comprising instructions;
a processor coupled to the memory; and
at least one communications interface coupled to the processor, the at least one communications interface being configured to connect and communicate with a peripheral device, and the instructions causing the processor to be configured to:

receive voice information from a second terminal;

identify, in the received voice information, to-be-obtained information of an object and object information associated with the object, the object being a user name;

determine at least one category to which of the to-be-obtained information belongs;

determine a first group name of a first group in the second terminal that includes contact information of a user associated with the second terminal;

determine a second group name of a second group in any category in the terminal that corresponds to the object, the second group name matching the first group name;

search, according to the second group name, the second group that corresponds to the object for target information associated with the object information; and process the target information.

8. The terminal of claim 7, wherein the instructions further cause the processor to be configured to detect whether a keyword in the voice information matches at least one keyword in a preset keyword library.

9. The terminal of claim 7, wherein the instructions further cause the processor to be configured to use the first group as the second group.

10. The terminal of claim 7, wherein the instructions further cause the processor to be configured to:

extract valid information from the object information; and use searchable textual information to search in the second group in any category for the target information associated with the valid information.

11. The terminal of claim 7, wherein the instructions further cause the processor to be configured to:

determine an auxiliary device connected to the terminal; and prompt the target information on the auxiliary device.

12. The terminal of claim 11, wherein the instructions further cause the processor to be configured to prompt the target information on the auxiliary device using the voice information when the auxiliary device is an in-vehicle terminal.

* * * * *

UNITED STATES PATENT AND TRADEMARK OFFICE
CERTIFICATE OF CORRECTION

PATENT NO. : 10,291,766 B2
APPLICATION NO. : 15/522939
DATED : May 14, 2019
INVENTOR(S) : Wenmei Gao et al.

It is certified that error appears in the above-identified patent and that said Letters Patent is hereby corrected as shown below:

On the Title Page

Item (30), Line 1: delete "(WO)"

In the Claims

Column 41, Line 6: delete "to which"

Column 41, Line 7: delete "belongs"

Signed and Sealed this
Sixteenth Day of July, 2019

Andrei Iancu
*Director of the United States Patent and Trademark Office*